(12) United States Patent
Ishii

(10) Patent No.: US 7,898,575 B2
(45) Date of Patent: Mar. 1, 2011

(54) IMAGE PICKUP DEVICE AND IMAGE RECORDING APPARATUS FOR RECORDING MOVING IMAGE DATA

(75) Inventor: Kensuke Ishii, San Diego, CA (US)

(73) Assignee: Olympus Corporation, Tokyo (JP)

( * ) Notice: Subject to any disclaimer, the term of this patent is extended or adjusted under 35 U.S.C. 154(b) by 1141 days.

(21) Appl. No.: 11/479,015

(22) Filed: Jun. 30, 2006

(65) Prior Publication Data

US 2007/0065139 A1    Mar. 22, 2007

(30) Foreign Application Priority Data

Sep. 21, 2005   (JP) .............................. 2005-273604

(51) Int. Cl.
H04N 5/228    (2006.01)
(52) U.S. Cl. .................................... 348/222.1; 348/568
(58) Field of Classification Search ................. 348/568, 348/222.1
See application file for complete search history.

(56) References Cited

U.S. PATENT DOCUMENTS

| | | | | |
|---|---|---|---|---|
| 4,339,775 A * | 7/1982 | Lemke et al. ................ 386/81 |
| 4,660,096 A * | 4/1987 | Arlan et al. ................ 386/34 |
| 5,170,259 A * | 12/1992 | Niihara .................... 348/415.1 |
| 5,430,486 A * | 7/1995 | Fraser et al. ............ 348/426.1 |
| 5,442,398 A * | 8/1995 | Koshiro et al. .......... 348/385.1 |
| 5,491,560 A * | 2/1996 | Sugawara et al. .......... 386/123 |
| 5,677,981 A * | 10/1997 | Kato et al. ................ 386/112 |
| 5,706,290 A * | 1/1998 | Shaw et al. ................ 370/465 |
| 6,243,095 B1 * | 6/2001 | Shile et al. ................ 715/854 |
| 6,249,324 B1 * | 6/2001 | Sato et al. ................ 348/705 |
| 6,404,928 B1 * | 6/2002 | Shaw et al. ................ 382/232 |
| 6,411,302 B1 * | 6/2002 | Chiraz ........................ 345/545 |
| 6,563,807 B1 * | 5/2003 | Kim et al. ................... 370/331 |
| 6,990,150 B2 * | 1/2006 | Fang ...................... 375/240.25 |
| 7,415,166 B2 * | 8/2008 | Kubota ........................ 382/284 |
| 2001/0026587 A1 * | 10/2001 | Hashimoto et al. ..... 375/240.03 |
| 2001/0031002 A1 * | 10/2001 | Hashimoto et al. ..... 375/240.03 |
| 2002/0196778 A1 * | 12/2002 | Colmant et al. ............. 370/352 |
| 2003/0023982 A1 * | 1/2003 | Lee et al. .................... 725/116 |
| 2003/0122971 A1 * | 7/2003 | Tanaka ........................ 348/723 |

(Continued)

FOREIGN PATENT DOCUMENTS

JP    A-09-261601    3/1997

(Continued)

OTHER PUBLICATIONS

Notice of Allowance issued on Sep. 28, 2010 in Counterpart Japanese Patent Application 2005-273604.

Primary Examiner—Jason Chan
Assistant Examiner—Cynthia Calderon
(74) Attorney, Agent, or Firm—Volpe and Koenig P.C.

(57) ABSTRACT

An image pickup device and an image recording apparatus are provided, each of which includes: a first selecting unit that selects an operational mode based on at least one of an image size and a frame rate; and a second selecting unit that selects, in accordance with the operational mode, at least one functional unit from a plurality of functional units, each of which is adapted to perform a function to process an image signal, so as to enable the at least one functional unit to actually perform the function.

15 Claims, 25 Drawing Sheets

| IMAGE PICKUP MODE | | 4K IMAGE PICKUP | 2K IMAGE PICKUP | 720P IMAGE PICKUP |
|---|---|---|---|---|
| RESOLUTION IN READ OUT | X | 4096 | 3072 | 1920 |
| | Y | 2160 | 1620 | 1080 |
| PIXEL POSITION IN READ OUT | X | 0 | 512 | 1088 |
| | Y | 0 | 270 | 540 |
| FRAME RATE IN READ OUT | | 60 | 90 | 150 |
| IMAGE PROCESSING | | ALGORITHM 1 | ALGORITHM 2 | ALGORITHM 3 |
| SIZE OF IMAGE OUTPUTTED FROM IMAGE PROCESSING UNIT | X | 4096 | 2048 | 1280 |
| | Y | 2160 | 1080 | 720 |
| FRAME RATE OF OUTPUT SIGNAL FROM IMAGE PROCESSING UNIT | | 60 | 90 | 150 |
| IMAGE OUTPUT UNITS TO BE USED | | 106a 106b 106c 106d | 106a 106b | 106a 106b 106c |
| SIZE OF OUTPUT IMAGE FROM IMAGE OUTPUT UNIT | X | 2048 | 2048 | 1280 |
| | Y | 1080 | 1080 | 720 |
| FRAME RATE OF OUTPUT SIGNAL FROM EACH IMAGE OUTPUT UNIT | | 60 | 45 | 50 |
| METHOD OF OUTPUT FROM PLURAL IMAGE OUTPUT UNITS | | SYNCHRONIZATION | FRAME INTERLEAVE | FRAME INTERLEAVE |

U.S. PATENT DOCUMENTS

| | | | |
|---|---|---|---|
| 2003/0174772 A1* | 9/2003 | Voronov et al. | 375/240.06 |
| 2005/0046900 A1* | 3/2005 | Nakamori | 358/1.18 |
| 2005/0212923 A1* | 9/2005 | Aiso | 348/222.1 |
| 2007/0024705 A1* | 2/2007 | Richter et al. | 348/142 |
| 2007/0258702 A1* | 11/2007 | Sugio et al. | 386/109 |
| 2007/0291167 A1* | 12/2007 | Inokawa | 348/387.1 |
| 2010/0045810 A1* | 2/2010 | Chun-Ru et al. | 348/222.1 |

FOREIGN PATENT DOCUMENTS

| | | |
|---|---|---|
| JP | A-10-336519 | 12/1998 |
| JP | A-2004-312664 | 4/2004 |
| JP | 2004-328034 | 11/2004 |
| JP | A-2005-204240 | 7/2005 |

* cited by examiner

FIG. 6

| IMAGE PICKUP MODE | | 4K IMAGE PICKUP | 2K IMAGE PICKUP | 720P IMAGE PICKUP |
|---|---|---|---|---|
| RESOLUTION IN READ OUT | X | 4096 | 3072 | 1920 |
| | Y | 2160 | 1620 | 1080 |
| PIXEL POSITION IN READ OUT | X | 0 | 512 | 1088 |
| | Y | 0 | 270 | 540 |
| FRAME RATE IN READ OUT | | 60 | 90 | 150 |
| IMAGE PROCESSING | | ALGORITHM 1 | ALGORITHM 2 | ALGORITHM 3 |
| SIZE OF IMAGE OUTPUTTED FROM IMAGE PROCESSING UNIT | X | 4096 | 2048 | 1280 |
| | Y | 2160 | 1080 | 720 |
| FRAME RATE OF OUTPUT SIGNAL FROM IMAGE PROCESSING UNIT | | 60 | 90 | 150 |
| IMAGE OUTPUT UNITS TO BE USED | | 106a 106b 106c 106d | 106a 106b | 106a 106b 106c |
| SIZE OF OUTPUT IMAGE FROM IMAGE OUTPUT UNIT | X | 2048 | 2048 | 1280 |
| | Y | 1080 | 1080 | 720 |
| FRAME RATE OF OUTPUT SIGNAL FROM EACH IMAGE OUTPUT UNIT | | 60 | 45 | 50 |
| METHOD OF OUTPUT FROM PLURAL IMAGE OUTPUT UNITS | | SYNCHRONIZATION | FRAME INTERLEAVE | FRAME INTERLEAVE |

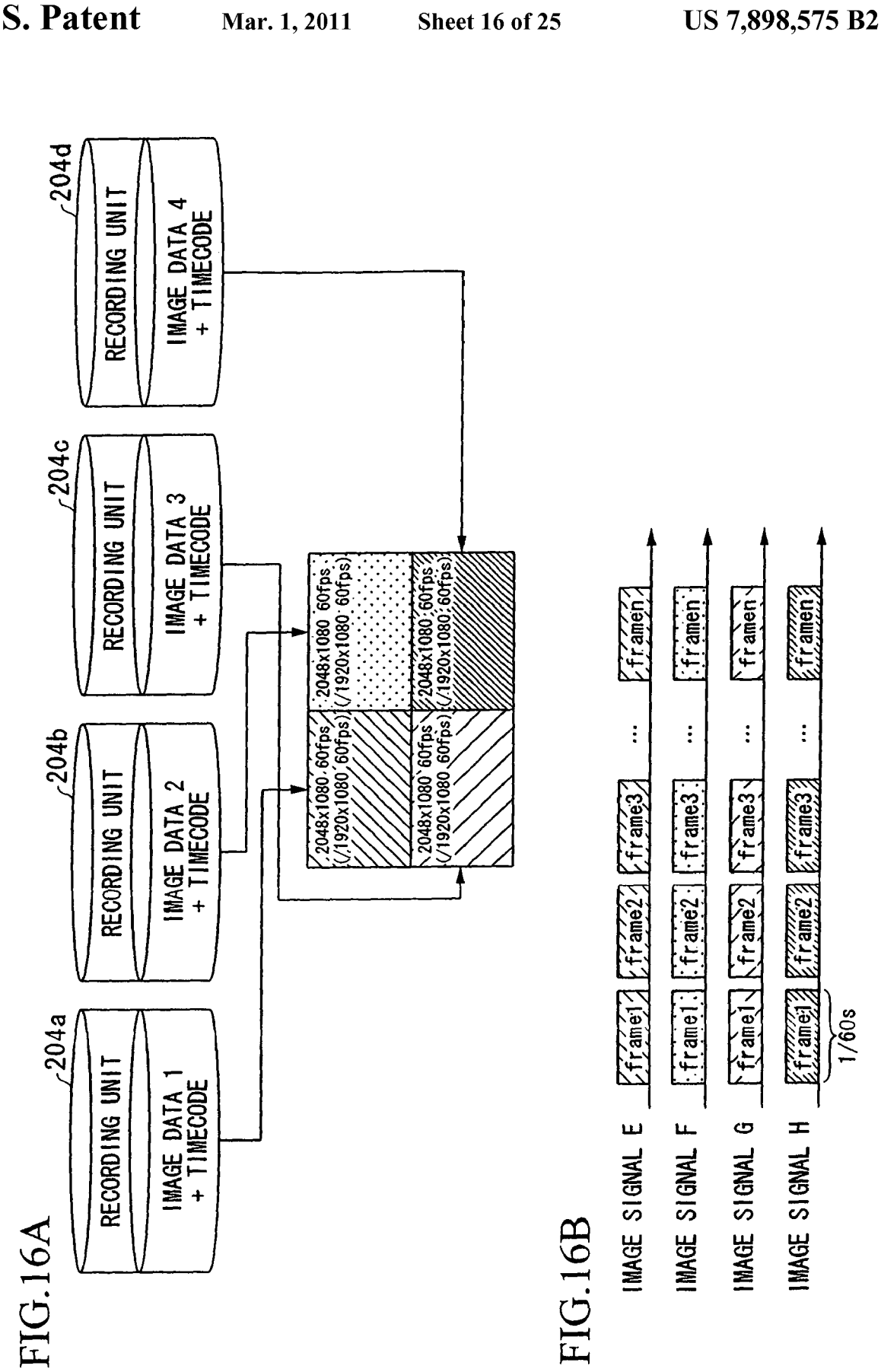

IMAGE PICKUP DEVICE AND IMAGE RECORDING APPARATUS FOR RECORDING MOVING IMAGE DATA

BACKGROUND OF THE INVENTION

1. Field of the Invention

The present invention generally relates to an image pickup device and an image recording apparatus. More specifically, the present invention relates to an image pickup device that is adapted to pick up moving image and an image recording apparatus that is adapted to store the moving image.

Priority is claimed on Japanese Patent Application No. 2005-273604, filed Sep. 21, 2005, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

FIG. 25 illustrates a configuration of a conventional image pickup device that is adapted to pick up moving images. The conventional image pickup device is realized by a camera 1z. The camera 1z includes a lens 102, a sensor 103, an image processing unit 104, and an image output unit 106. A light is incident into the lens 102 and focused on an image pickup surface of the sensor 103, thereby forming an image on the image pickup surface, so that the image is then optoelectronically converted by the sensor 103. The sensor 103 picks up an image of an object and generates an image signal based on the image of the object.

The image processing unit 104 receives the image signal that has been outputted from the sensor 103 and performs a predetermined function of processing the received image signal. The image signal that has been processed by the image processing unit 104 is transmitted to the image output unit 106 and then outputted from the output unit 106, so that the outputted image signal is then recorded by a recorder that is placed outside the camera 1z.

A conventional image pickup device has been developed, which utilizes a CMOS sensor. This conventional image pickup device changes a read-out region of a sensor so as to switch between or among the following formats, each of which includes the size of an image picked up and a frame rate.

The First Format: 4k {QHD (Quadruple High Definition) or SHD (Super High Definition)}/60 fps (fps: frame per second).

The Second Format: HDTV (High Definition Television)/90 fps.

The Third Format: 720 p/150 fps.

Japanese Laid-Open Patent Publication No. 2004-328034 discloses a conventional image pickup device that replays time-serially the divided sets of image data so as to produce a united moving image, wherein the divided sets of image data have been assigned with different names and stored in plural storage media.

SUMMARY OF THE INVENTION

In accordance with a first aspect of the present invention, an image pickup device comprises: an image pickup element that picks up an image of an object so as to generate an image signal based on the image of the object; a plurality of image output units, each of the plurality of image output units being adapted to output the image signal; an image pickup mode selecting unit that selects an image pickup mode based on at least one of an image size and a frame rate; and an output selecting unit that selects at least one image output unit from the plurality of image output units in accordance with the image pickup mode so as to enable the at least one image output unit to actually output the image signal.

In accordance with a second aspect of the present invention, an image pickup device comprises: an image pickup element that picks up an image of an object so as to generate an image signal based on the image of the object; a plurality of recording units, each of the plurality of recording units being adapted to record the image signal; an image pickup mode selecting unit that selects an image pickup mode based on at least one of an image size and a frame rate; and a record selecting unit that selects at least one recording unit from the plurality of recording units in accordance with the image pickup mode so as to enable the at least one recording unit to actually record the image signal.

In accordance with a third aspect of the present invention, an image recording apparatus comprises: a plurality of image input units, each of the plurality of image input units being adapted to receive an input of an image signal; a recording mode selecting unit that selects a recording mode based on at least one of an image size and a frame rate; an input selecting unit that selects at least one image input unit from the plurality of image input units in accordance with the recording mode so as to enable the at least one image input unit to actually receive the input of the image signal; and a recording unit that is adapted to record the image signal that is supplied from the at least one image input unit.

In accordance with a fourth aspect of the present invention, an image pickup device comprises: an image signal generating unit that generates an image signal based on an image of an object; a plurality of functional units, each of the plurality of functional units being adapted to perform a function to process or deal with the image signal; a first selecting unit that selects an image pickup mode based on at least one of an image size and a frame rate; and a second selecting unit that selects at least one functional unit from the plurality of functional units in accordance with the image pickup mode so as to enable the at least one functional unit to actually perform the function.

In accordance with a fifth aspect of the present invention, an image recording apparatus comprises: a plurality of functional units, each of the plurality of functional units being adapted to perform a function to process or deal with an image signal; a first selecting unit that selects a recording mode based on at least one of an image size and a frame rate; a second selecting unit that selects at least one functional unit from the plurality of functional units in accordance with the recording mode so as to enable the at least one functional unit to actually perform the function; and a recording unit that is adapted to record the image signal that is supplied from the at least one functional unit.

In accordance with a sixth aspect of the present invention, a selecting device comprises: a first selecting unit that selects an operational mode based on at least one of an image size and a frame rate; and a second selecting unit that selects, in accordance with the operational mode, at least one functional unit from a plurality of functional units, each of which is adapted to perform a function to process or deal with an image signal, so as to enable the at least one functional unit to actually perform the function.

Objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure:

FIG. 6 is a view illustrating an example of a data table referred by an image pickup mode switching unit included in the image pickup device of FIG. 3;

FIG. 16A is a view illustrating an example of recording of image data of a 4k image signal;

FIG. 16B is a view illustrating frames of each of four divided sets of image signals that are, respectively, outputted from selected four image output units;

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
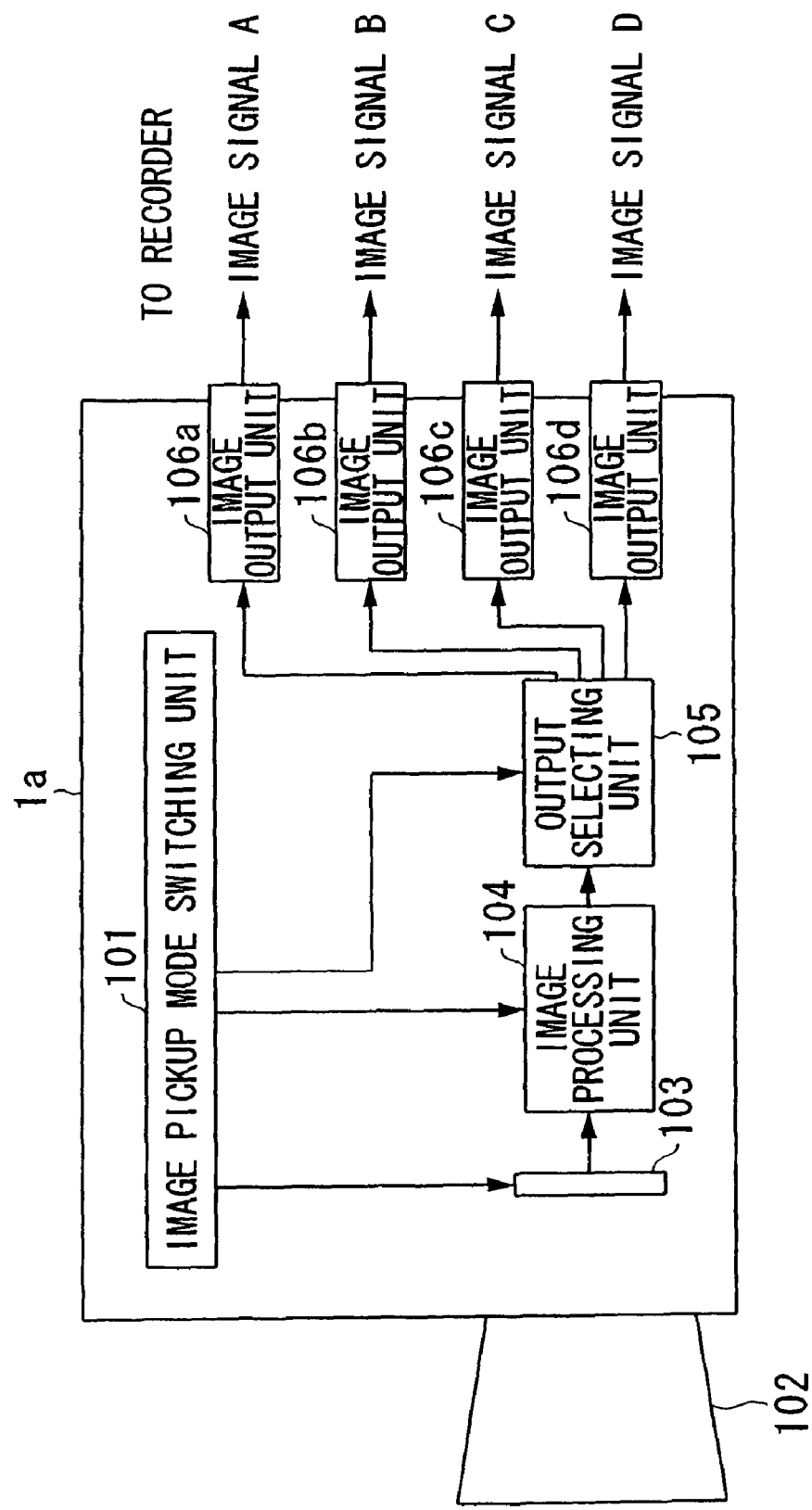
FIG. 1 is a block diagram illustrating a configuration of an image pickup device in accordance with a first embodiment of the present invention.

FIG. 1 illustrates a configuration of an image pickup device in accordance with a first embodiment of the present invention. The image pickup device may comprise an image pickup element that picks up an image of an object so as to generate image signals based on the image of the object, a plurality of image output units that output the image signals, an image pickup mode selecting unit that selects an image pickup mode based on at least one of a size of an image picked up and a frame rate, and an output selecting unit that selects at least one image output unit from the plurality of image output units in accordance with the image pickup mode selected by the image pickup mode selecting unit.

A typical example of the image pickup device may be, but is not limited to, a camera 1*a*. The image pickup element may comprise a sensor 103. The plurality of image output units may comprise image output units 106*a*, 106*b*, 106*c*, and 106*d*. The output selecting unit may comprise an output selecting unit 105 alone or in combination with a function of an image pickup mode switching unit 101 to decide the number of the image output units. The image pickup unit may optionally include a dividing unit that may comprise an image processing unit 104.

The image pickup mode selecting unit may, for example, comprise the image pickup mode switching unit 101. The image pickup mode switching unit 101 selects a size of an image to be outputted from the image processing unit 104, for example, a size of an image to be picked up, which represents the number of horizontal pixels, the number of vertical pixels and the number of data bits, which will hereinafter be referred to as an "image size". The image pickup mode switching unit 101 further selects, in accordance with user's instructions, an image pickup mode from plural image pickup modes that have different frame rates of image signals, for example, the 4k image pickup mode, the 2k image pickup mode, the HD image pickup mode, and 720 p image pickup mode. The following descriptions will be made by fixing the number of data bits, for example, at 10 bits, for every image pickup mode with omitting any description of the number of data bits. It is of course possible that the number of data bits is different between the image pickup modes.

The image pickup mode is defined by at least one of the image size and the frame rate. A user may operate switches or keys to select an image pickup mode so that the image pickup mode switching unit 101 recognizes the instruction of selecting the image pickup mode based on a signal generated by the user's operation.

The image pickup mode switching unit 101 supplies the image processing unit 104 and the output selecting unit 105 with setting parameters that correspond to the selected image pickup mode. The image pickup mode switching unit 101 has functions to switch between the plural image pickup modes and to switch a selected image pickup mode in each unit.

A light is incident into the lens 102 and focused on an image pickup surface of the sensor 103, thereby forming an image on the image pickup surface, so that the image is then optoelectronically converted by the sensor 103. The sensor 103 picks up the image of an object and generates an image signal based on the image of the object. The sensor 103 is adapted to supply image signals at the image size and the frame rate, both of which have been set by the image pickup mode switching unit 101. The image processing unit 104 performs predetermined image processes such as Bayer interpolation and color correction for the image signals that have been supplied by the sensor 103. The image size of the image signal supplied from the sensor 103 to the image processing unit 104 is not always identical with the image size of the image signal outputted from the image processing unit 104. It is possible that the image processing unit 104 performs a resolution conversion of the image signals in order to improve the quality of image. The image processing unit 104 may, if any, have a function to divide the image. The dividing unit of the present invention can be realized by this function.

Figure 2:
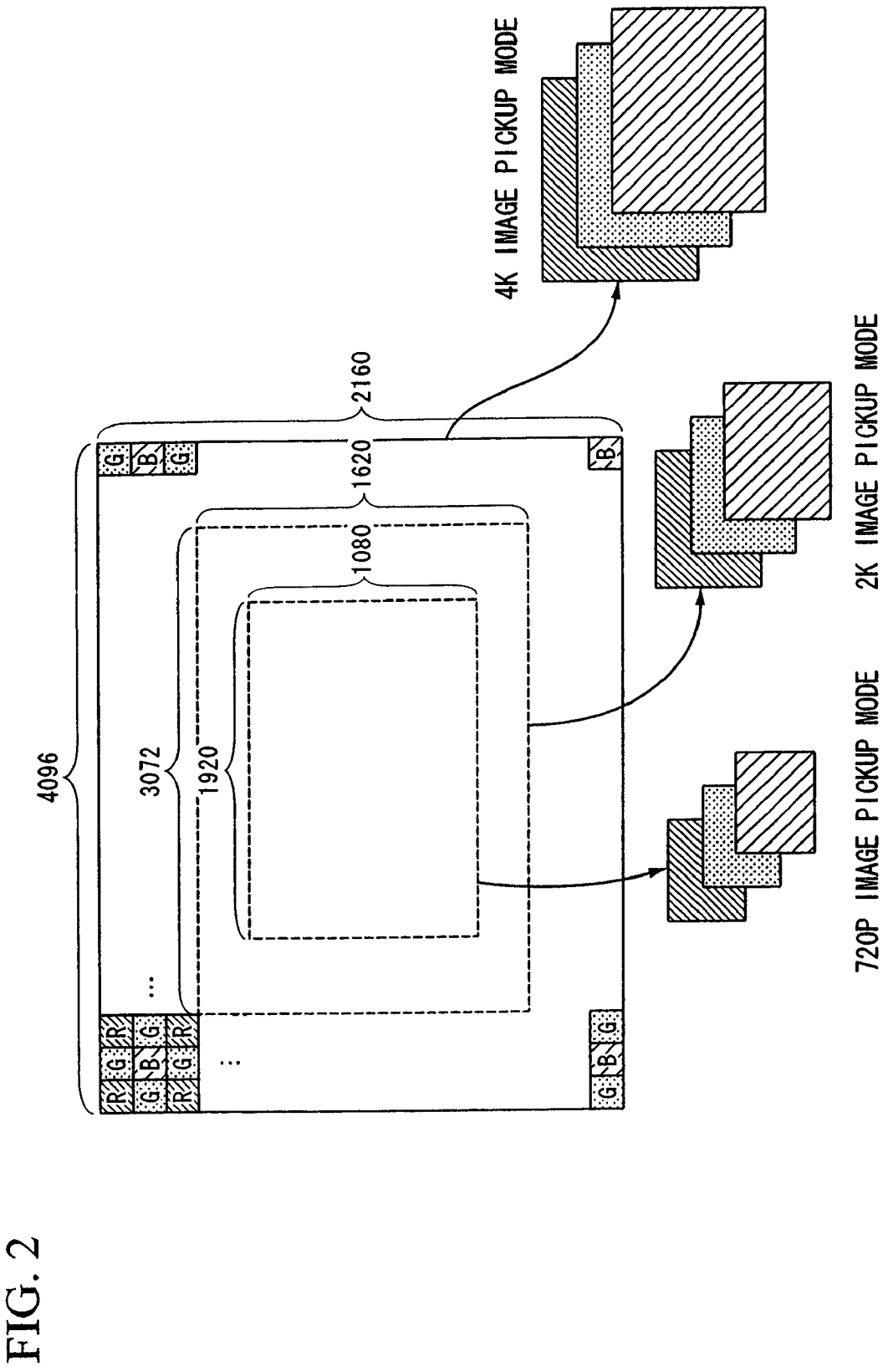
FIG. 2 is a view illustrating an example of a resolution conversion that is performed by an image processing unit included in the image pickup device of FIG. 1.

FIG. 2 illustrates an example of a resolution conversion that is performed by the image processing unit 104. The maximum size of the image constituting the image signals that can be supplied by the sensor 103 is 4096×2160. In the 4k image pickup mode, the sensor 103 supplies image signals of an image size of 4096×2160 so that the image processing unit 104 performs the Bayer interpolation and the color correction without performing any resolution conversion so as to generate and output image signals that have an image size of 4096×2160. In the 2k image pickup mode, the sensor 103 supplies image signals of an image size of 3072×1620 so that the image processing unit 104 performs the Bayer interpolation and the color correction with further performing a resolution conversion thereof so as to generate and output image signals that have an image size of 2048×1080. In the 720 p image pickup mode, the sensor 103 supplies image signals of an image size of 1920×1080 so that the image processing unit 104 performs the Bayer interpolation and the color correction with further performing a resolution conversion thereof so as to generate and output image signals that have an image size of 1280×720.

With reference back to FIG. 1, the output selecting unit 105 selects at least one image output unit from the plural image output units 106*a*-106*d* so that the selected at least one image output unit will actually output the image signals. The image pickup mode switching unit 101 decides, in accordance with the selected image pickup mode, the number of the image output units that are necessary for outputting the image signals, so that the image pickup mode switching unit 101 supplies the output selecting unit 105 with the decided number as a setting parameter. The output selecting unit 105 selects the number of the image output units 106, which corresponds to the decided number that has been notified by the image pickup mode switching unit 101. The output selecting unit of the present invention can be realized by the output selecting unit 105 and the function of the image pickup mode switching unit 101 to decide the number of the image output units 106. It is possible as a modification for the image pickup mode switching unit 101 to select the image pickup mode and notify the selected one to the output selecting unit 105 so that the output selecting unit 105 decides the number of the image output units that will actually output the image signals. An example of the selection of the image output units 106*a*-106*d* will be described below.

The image output units 106*a*-106*d* are conformed to a general purpose interface regulation for image signal output, such as HD-SDI, NTSC, and DVI. The output selecting unit 105 supplies the image signals to the image output unit or units 106 that have been selected by the output selecting unit 105. Four image output units 106*a*, 106*b*, 106*c* and 106*d* are illustrated in FIG. 1. There is no limitation to the number of the image output units so long as the plurality of mage output units are provided. The above-described configuration permits the user to select a desired image pickup mode, based on which at least one of the image output units performs an output of the image signals.

Figure 3:
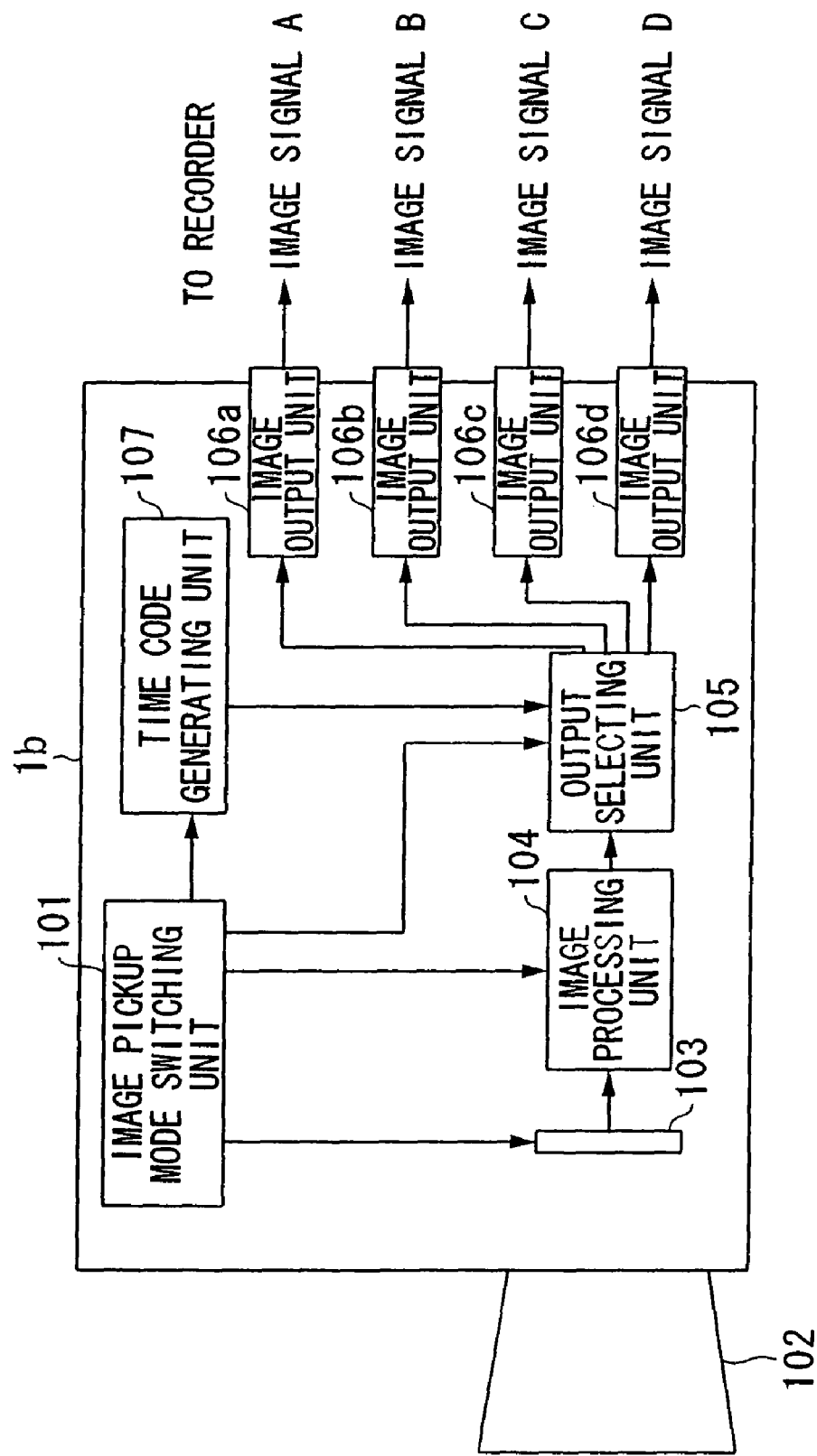
FIG. 3 is a block diagram illustrating another configuration of an image pickup device in accordance with a first modification of the first embodiment of the present invention.

FIG. 3 illustrates a first modification of the first embodiment. The image pickup device can be realized by a camera 1*b*. This camera 1*b* is different from the above-described camera 1*a* in view of further including a time code generating unit 107. The time code generating unit 107 is adapted to generate time codes to be supplied to the image signals, in accordance with the image pickup mode that has been set by the image pickup mode switching unit 101. The time code generating unit 107 is also adapted to supply the generated time codes to the output selecting unit 105. The output selecting unit 105 is also adapted to attach or add the time codes to the image signals and output the same. In order to enable the plural image output units 106*a*-106*d* to output the image signals simultaneously or synchronously, the time code generating unit 107 is adapted to generate the same time code for the plural image output units 106*a*-106*d*. In order to enable the plural image output units 106*a*-106*d* to output the image signals at different timings, the time code generating unit 107 is also adapted to generate different time codes for the plural image output units 106*a*-106*d*.

The above-described configuration of the image pickup device permits a user to select a desired image pickup mode, based on which the plural image output units 106*a*-106*d* output the image signals with the time codes. It is possible as a modification for each time code to include an ancillary data area that contains the image pickup mode, the frame rate and the frame number as predetermined sets of information, so that the predetermined sets of information are added to the image signals.

Figure 4:
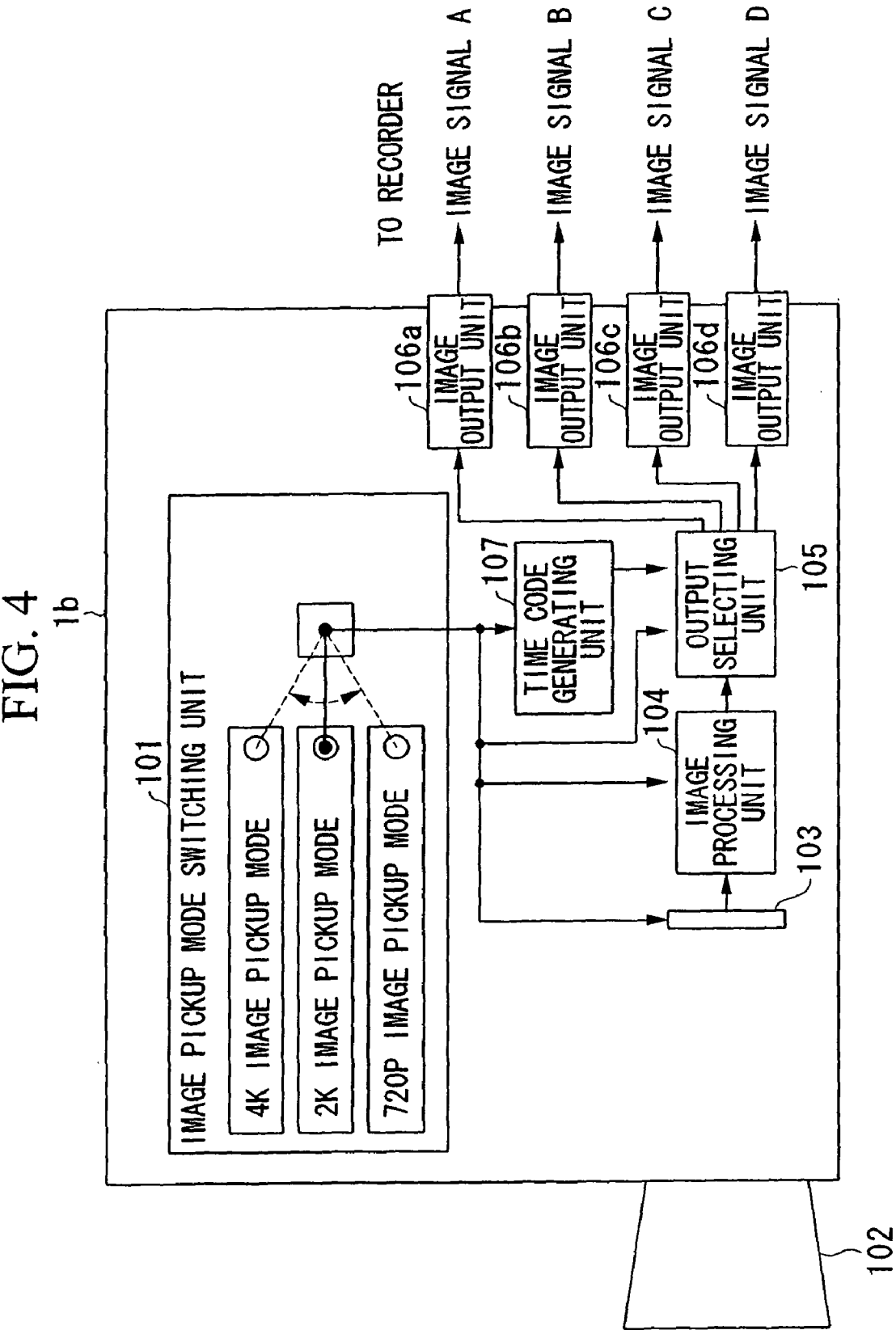
FIG. 4 is a block diagram illustrating operations of an image pickup mode switching unit included in the image pickup device of FIG. 3.

Operations of the image pickup device of the present embodiment will be described. As shown in FIG. 4, the image pickup mode switching unit 101 is adapted to select one of the following three image pickup modes.

4k image pickup mode: image size of 4096×2160; frame rate of 60 fps.

2k image pickup mode: image size of 2048×1080; frame rate of 90 fps.

720 p image pickup mode: image size of 1280×720; frame rate of 150 fps.

The above-mentioned image sizes are merely shown by way of illustration. The SHD image size of 3840×2160 and the HD image size of 1920×1080 are available. The image size and the fastest frame rate of the image signals that are supplied from the sensor 103 vary depending upon performances of the sensor 103 and of electric circuits such as a clock generator circuit.

Figure 5:
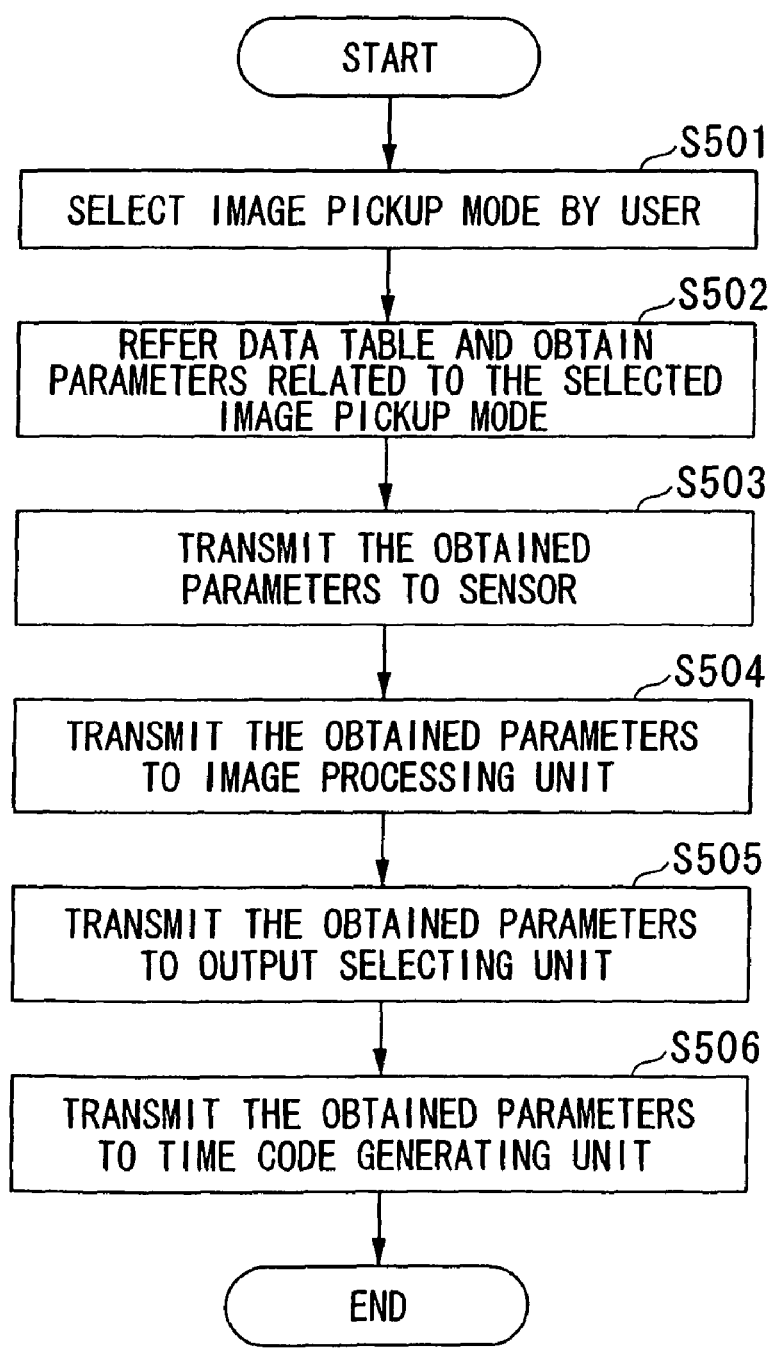
FIG. 5 is a flow chart illustrating operations of the image pickup device of FIG. 3.

With reference to FIG. 5, operations of the image pickup device to select the image output units 106a-106d will be described. In Step S501, an image pickup mode is selected by a user. A signal that represents the selected image pickup mode is inputted into the image pickup mode switching unit 101. In accordance with this signal, the image pickup mode switching unit 101 selects an image pickup mode. In Step S502, the image pickup mode switching unit 101 refers a data table that defines a relationship between every image pickup mode and a parameter that identifies the number of at least one image output unit 106 that will actually output the image signals in the every image pickup mode. FIG. 6 illustrates an example of the data table. The image pickup mode switching unit 101 reads out and obtains parameters related to the selected image pickup mode from the data table. In Step S503, the image pickup mode switching unit 101 transmits the obtained parameters to the sensor 103. In Step S504, the image pickup mode switching unit 101 transmits the obtained parameters to the image processing unit 104. In Step S505, the image pickup mode switching unit 101 transmits the obtained parameters to the output selecting unit 105. In Step S506, the image pickup mode switching unit 101 transmits the obtained parameters to the time code generating unit 107. There are no limitations to the sequences of the above-described Steps S501-S506. The image pickup mode switching unit 101 may perform operations in different sequences from what is shown in FIG. 5.

Typical examples of the parameters to be supplied to the sensor 103 may include, but are not limited to, resolutions of the image signals to be read out, positions of pixels from which the image signals are read out, and the frame rates. Typical examples of the other parameters to be supplied to the image processing unit 104 may include, but are not limited to, identifiers that identify image processing methods, and the image size and the frame rate of the image signals to be outputted from the image processing unit 104. Typical examples of the other parameters to be supplied to the output selecting unit 105 may include, but are not limited to, identifiers that identify the image output units to be used, the image size and the frame rate of the image signals to be outputted from the image output units, and the methods of outputting the image signals from each of the image output units. Typical examples of the other parameters to be supplied to the time code generating unit 107 may include, but are not limited to, the number of the image output units to be used, the frame rate of the image signals to be outputted from the image output units, and the methods of outputting the image signals from each of the image output units.

Parameters to be supplied to the output selecting unit 105 from the data table should not be limited unless the parameters do not identify the number of the image output units that will actually output the image signals in each of the image pickup modes. The number of the image output units to be used for the outputs of the image signals has previously been set as the parameters for each image pickup mode on the data table. The output selecting unit 105 selects a minimum number of at least one image output unit that will actually output the image signal so as to enable the at least one image output unit to output the image signal in an available range of data transfer rate, for example, a transferable amount of data per unit time, for example, second.

Figures 7A, 7B:
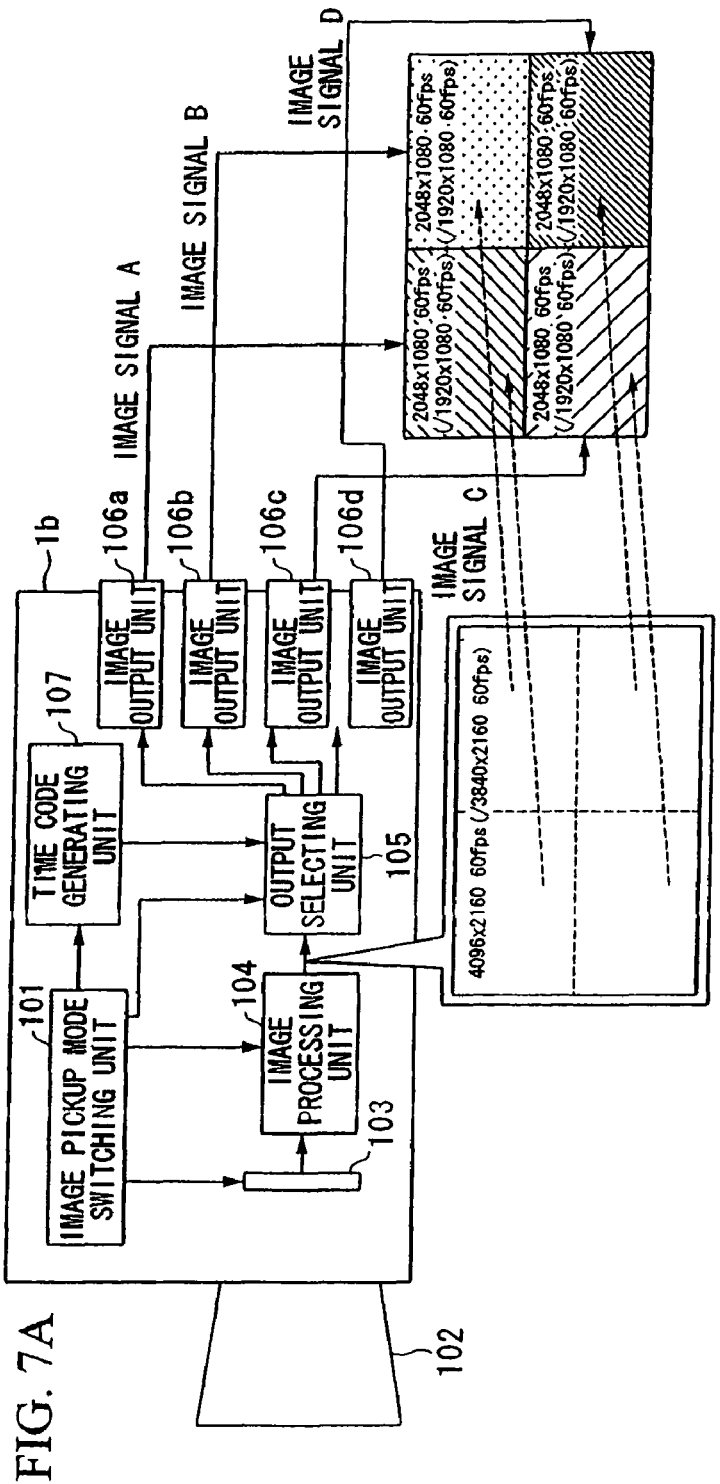
FIG. 7A is a view schematically illustrating examples of images to be outputted in a 4k image pickup mode.
FIG. 7B is a view illustrating frames of each of four divided sets of image signals that are, respectively, outputted from selected four image output units.

FIG. 7A illustrates schematically examples of the images to be outputted in the 4k image pickup mode as selected. Image signals of the 4k image size of 4096×2160 are outputted at a frame rate of 60 fps from the image processing unit 104. The image processing unit 104 performs the above-described operations of image processing and divides the image signal for each frame into four divided sets of image signals, and supplies the four sets of the divided image signals to the output selecting unit 105. Each of the four divided sets of the image signals has an image size of 2048×1080. As shown on the data table of FIG. 6, the output selecting unit 105 selects the four image output units 106a-106d. The selected four image output units 106a-106d simultaneously or synchronously output the four divided sets of image signals, respectively, one frame by one frame at the frame rate of 60 fps.

FIG. 7B illustrates frames 1, 2, . . . , n of each of the four divided sets of image signals A, B, C, and D that are, respectively, outputted from the selected four image output units 106a-106d. As shown in FIG. 7B, for every frame, the four divided sets of image signals A, B, C, and D are simultaneously or synchronously outputted from the selected four image output units 106a-106d, respectively. The output selecting unit 105 provides the image signals with the time codes that have been generated by the time code generating unit 107 and supplies the image signals with the time codes to the image output units 106a-106d. For every frame, the time code is the same among the four divided sets of image signals A, B, C, and D. It is possible as a modification to use other image signals of the SHD image size of 3840×2160 for performing the image outputs similarly to the above-described method, wherein each of the four divided sets of image signals have an image size of 1920×1080.

Figure 8A:
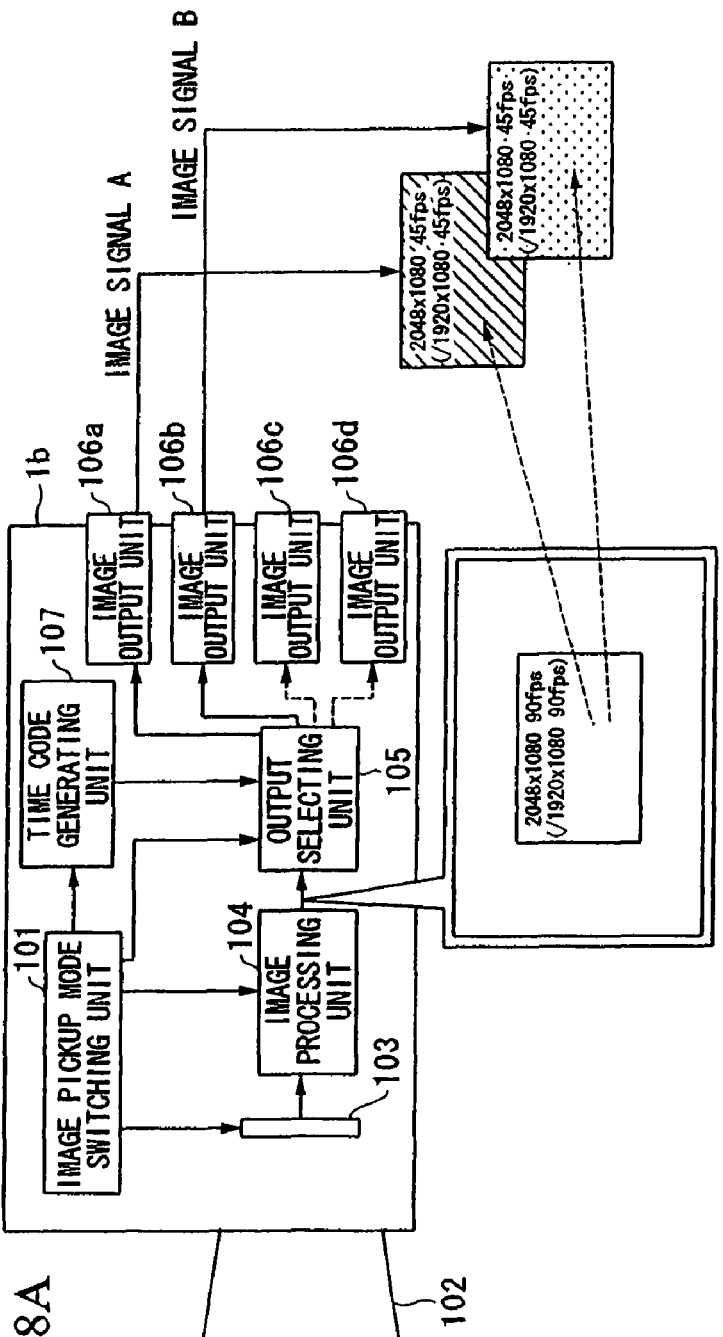
FIG. 8A is a view schematically illustrating examples of images to be outputted in a 2k image pickup mode.

FIG. 8A illustrates schematically examples of the images to be outputted in the 2k image pickup mode as selected. Image signals of the 2k image size of 2048×1080 are outputted at a frame rate of 90 fps from the image processing unit 104. As shown on the data table of FIG. 6, the output selecting unit 105 selects the two image output units 106a and 106b. The selected two image output units 106a and 106b output, at a frame rate of 45 fps, the image signals A and B, respectively, with interleaving frames between the selected two image output units 106a and 106b.

Figure 8B:
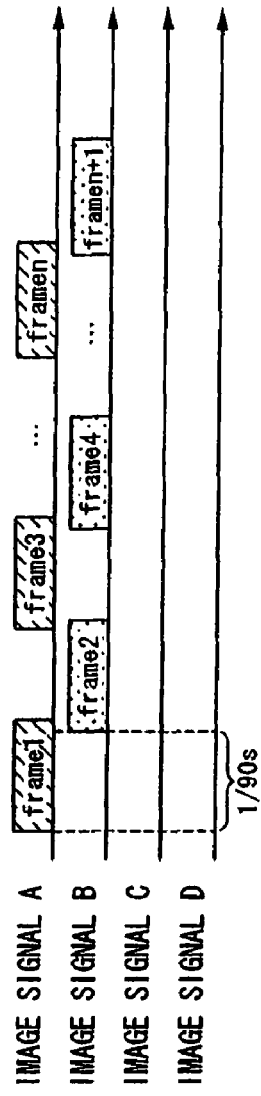
FIG. 8B is a view illustrating frames of image signals, which are alternately outputted with a time-overlap from selected two image output units.

FIG. 8B illustrates frames 1, 2, . . . , n, n+1 of the image signals A and B, which are alternately outputted with slight time-overlap from the selected two image output units 106a and 106b. As shown in FIG. 8B, the selected two image output units 106a and 106b interleave the frames between the image signals A and B so that the selected two image output units 106a and 106b output the image signals A and B, respectively and alternately one frame by one frame. None of the same frames of the image signals is outputted simultaneously or synchronously from the selected two image output units 106a and 106b. Different time codes are given to the image signals A and B.

As described above, the two image output units output with interleaving the frames so as to output high definition image signals without causing the data output rate per unit time to exceed a predetermined range that is acceptable to each of the image output units. It is possible as a modification to use other image signals of the HD image size of 1920×1080 for performing the image outputs in a method that is similar to the above-described method.

Figure 9A:
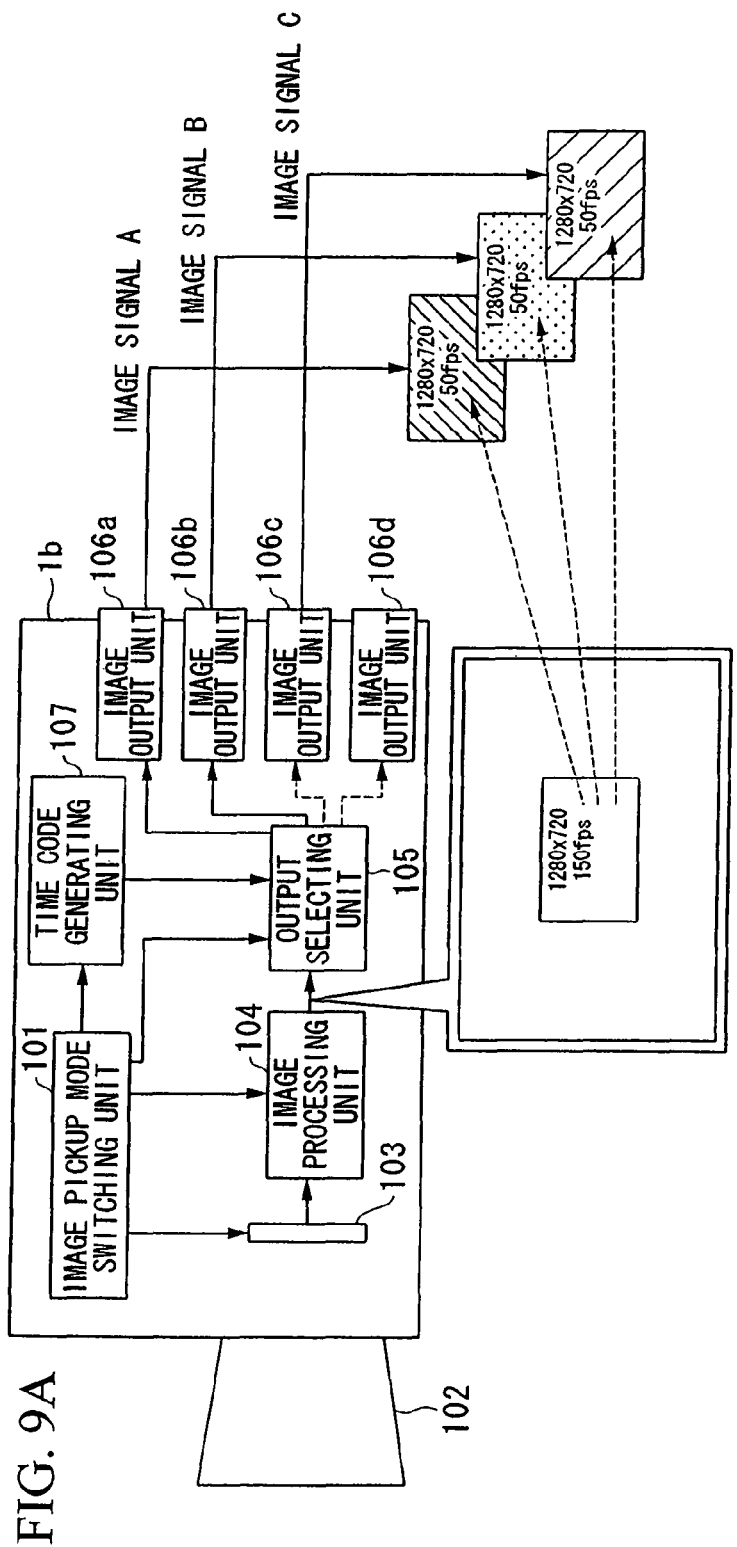
FIG. 9A is a view illustrating schematically examples of images to be outputted in a 720 p image pickup mode.

FIG. 9A illustrates schematically examples of the images to be outputted in the 720 p image pickup mode as selected. Image signals of the 720 p image size of 1280×720 are outputted at a frame rate of 150 fps from the image processing unit 104. As shown on the data table of FIG. 6, the output selecting unit 105 selects the three image output units 106a, 106b and 106c. The selected three image output units 106a, 106b and 106c output, at a frame rate of 50 fps, the image signals A, B and C, respectively, with interleaving frames among the selected three image output units 106a, 106b and 106c.

Figure 9B:
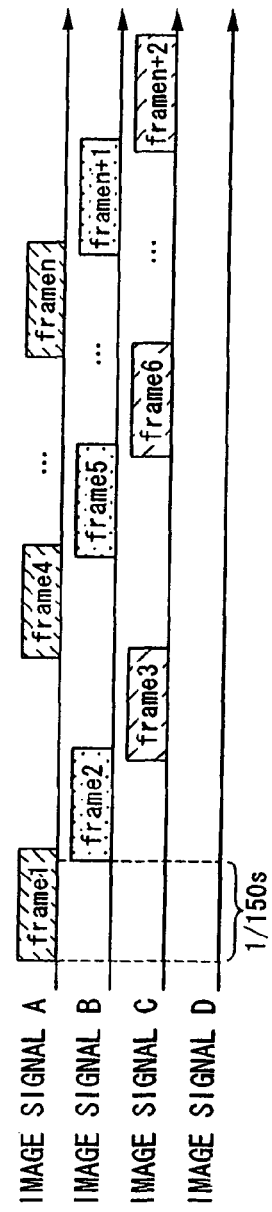
FIG. 9B is a view illustrating frames of image signals which are in turn outputted with a time-overlap from selected three image output units.

FIG. 9B illustrates frames 1, 2, . . . , n, n+1, n+2 of the image signals A, B, and C which are in turn outputted with slight time-overlap from the selected three image output units 106a, 106b and 106c. As shown in FIG. 9B, the selected three image output units 106a, 106b and 106c interleave the frames among the image signals A, B, and C to output in turn the image signals A, B, and C, respectively and one frame by one frame. None of the same frames of the image signals is outputted simultaneously or synchronously from the selected three image output units 106a, 106b and 106c. Different time codes are given to the image signals A, B, and C.

Figure 10:
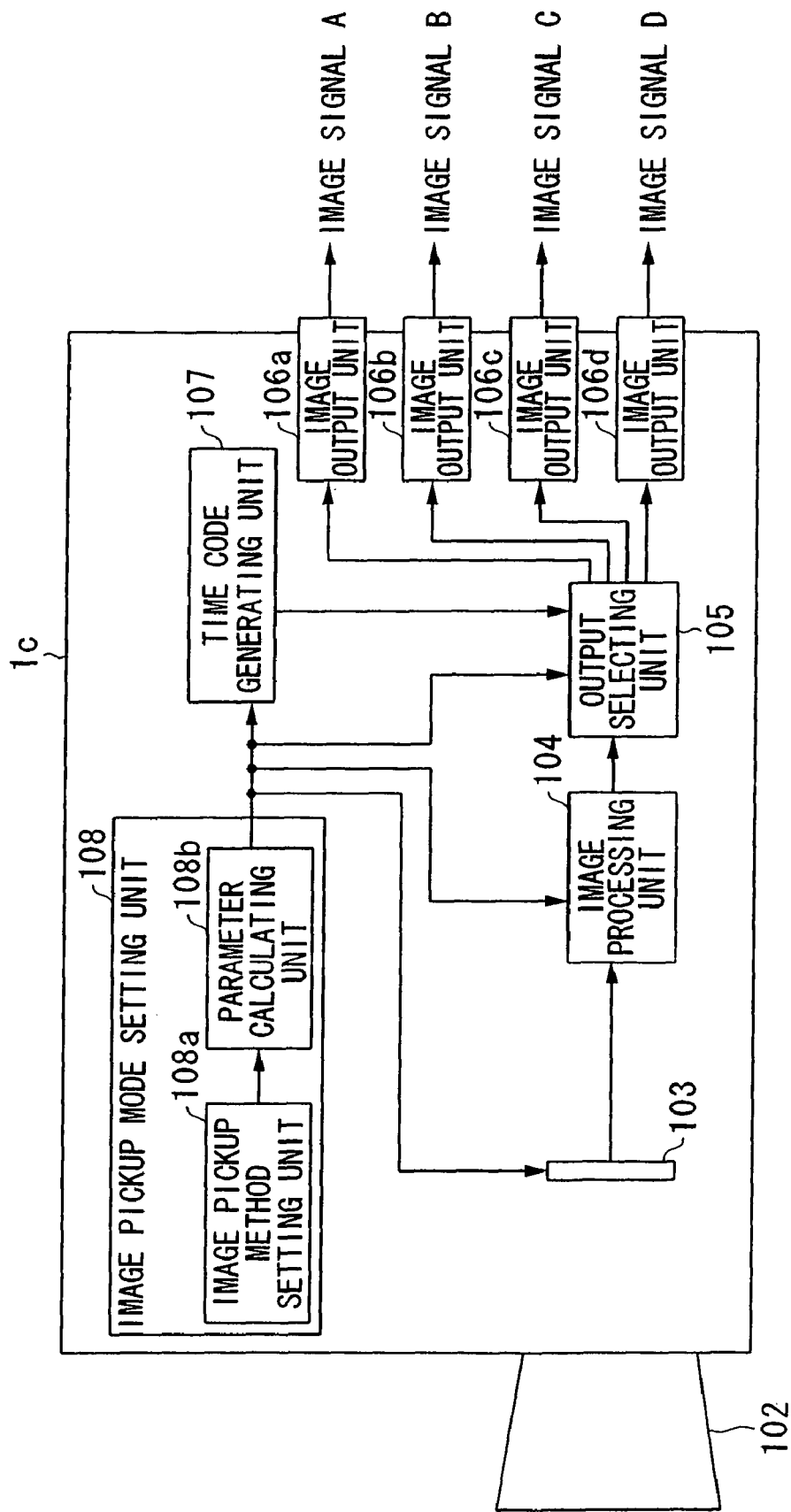
FIG. 10 a block diagram illustrating still another configuration of an image pickup device in accordance with a second modification of the first embodiment of the present invention.

A second modification of the first embodiment will be described. FIG. 10 illustrates the second modification of the first embodiment. The image pickup device can be realized by a camera 1c. This camera 1c is different from the above-described camera 1b in view of further including an image pickup mode setting unit 108. The image pickup mode setting unit 108 performs the settings of the image size, the frame rate and the image processing methods in accordance with the users' instructions. The above-described image pickup device of FIG. 1 is designed to allow an user to select a desired one of the predetermined image pickup modes. In contrast, the image pickup device of FIG. 10 is designed to allow an user to enter or set an optional image size and a optional frame rate.

The image pickup mode setting unit 108 may further include an image pickup method setting unit 108a and a parameter calculating unit 108b. The image pickup method setting unit 108a detects signals that have been generated by users' operations to switches or keys, thereby identifying the image size and the frame rate that have been entered by the user. The mage pickup method setting unit 108a notifies the identified image size and frame rate to the parameter calculating unit 108b. The parameter calculating unit 108b calculates respective setting parameters for the sensor 103, the image processing unit 104, the output selecting unit 105, and the time code generating unit 107, based on input information such as the image size and the frame rate that have been notified by the image pickup method setting unit 108a. The parameter calculating unit 108b transmits the calculated setting parameters to the sensor 103, the image processing unit 104, the output selecting unit 105, and the time code generating unit 107, respectively.

The above described configuration of the image pickup device permits an user to set an optical image size and an optional frame rate so as to set an optional image pickup mode, instead of the limited selection of the predetermined image pickup modes. This gives the user a wide variety of the image pickup mode options.

Figure 11:
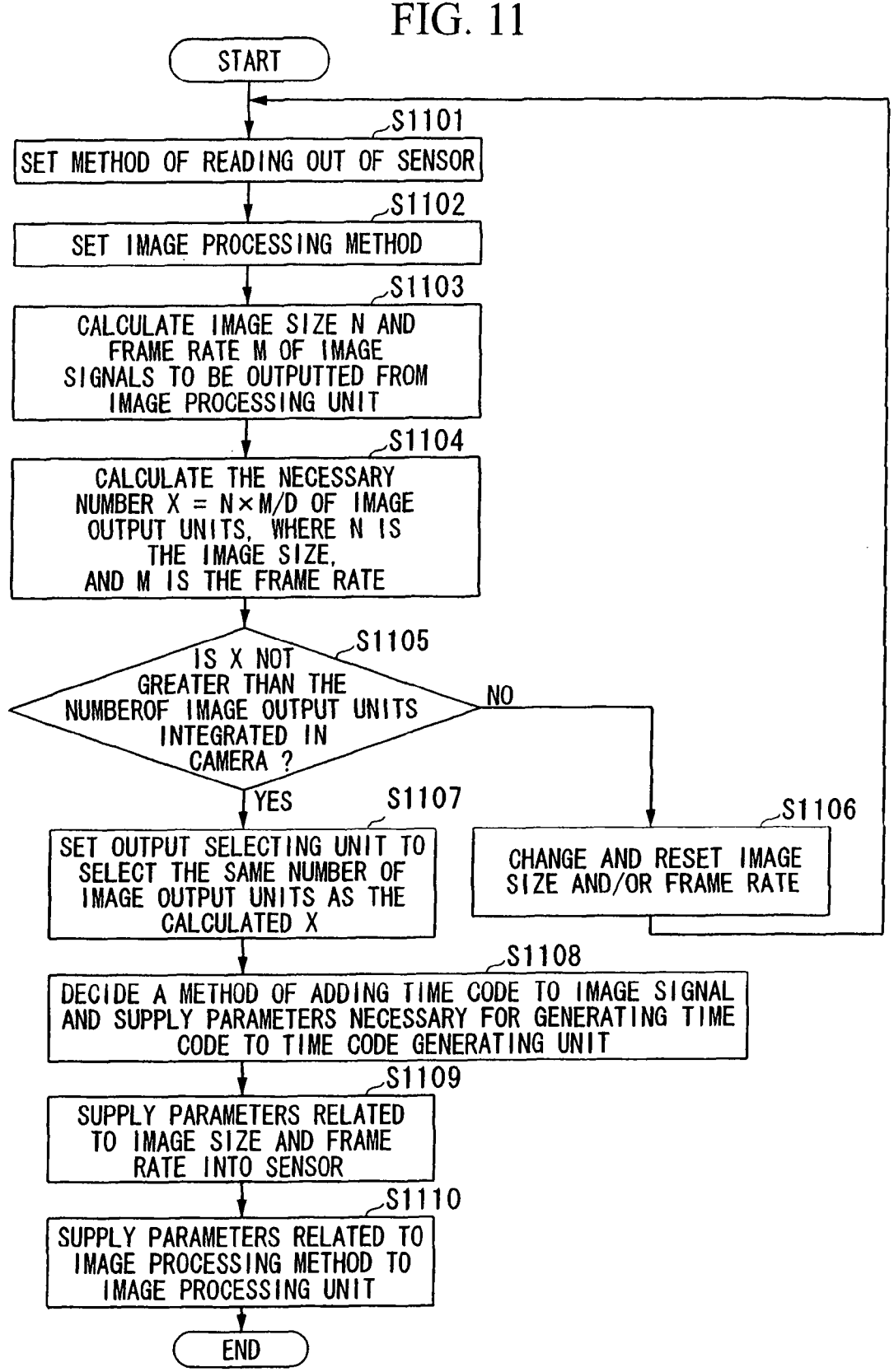
FIG. 11 is a flow chart illustrating operations to select the image output units included in the image pickup device of FIG. 10.

Operations of the image pickup device to select the image output units 106a-106d will be described with reference to FIG. 11. In Steps S1101 and S1102, an user enters an image size, a frame rate and an image processing method into the image pickup method setting unit 108a, thereby setting the sensor reading method and the image processing method. In Step S1103, the image pickup method setting unit 108a notifies the entered image size, frame rate and image processing method to the parameter calculating unit 108b. The parameter calculating unit 108b calculates, based on the notified image size and frame rate, an image size N and a frame rate M of image signals to be outputted from the image processing unit 104. In Step S1104, the parameter calculating unit 108b further calculates a value of N×M/D, where D is an upper limit of an available range of data transfer rate per unit time of each of the image output units 106, N is the image size, and M is the frame rate. The data transfer rate means an amount of data that is transferable per unit time, for example, per second, by each image output unit 106. The parameter calculating unit 108b rounds up the figures below the decimal place of the product of N×M/D so as to find an integer X which represents the necessary number of the image output units 106 for performing the output of the image signal at the image size N and the frame rate M.

Namely, the number of the image output units 106 that are to be used for outputting the image signals are calculated in accordance with the selected image pickup mode. The output selecting unit 105 selects a minimum number of at least one image output unit 106 that will actually output the image signal so as to enable the at least one image output unit 106 to output the image signal in an available range of data transfer rate, for example, a transferable amount of data per unit time, for example, second. In Step S1105, the parameter calculating unit 108b verifies whether the calculated integer X is not greater than the number of the image output units 106 integrated in the camera 1c.

If the calculated integer X is greater than the number of the image output units 106 in the camera 1c, the process enters into Step S1106. An error message is displayed by a display that is not illustrated so that the user is given an opportunity to reconsider changing of one or both of the image size and the frame rate so as to reset the changed one or ones of the image size and the frame rate into the image pickup method setting unit 108a. Subsequently, the above-described processes of Steps S1101 through S1105 will be repeated until it has been verified that the calculated integer X is not greater than the number of the image output units 106 integrated in the camera 1c.

If the calculated integer X is not greater than the number of the image output units 106 in the camera 1c, the process enters into Step S1107. The image pickup mode setting unit 108 sets the output selecting unit 105 to select the same number of the image output units as the calculated integer X so as to enable the selected image output units to output the image signals. In Step S1108, the image pickup mode setting unit 108 decides a method of adding time codes to the image signals in accordance with the selected image pickup mode so that the image pickup mode setting unit 108 sets parameters necessary for generating the time codes to the time code generating unit 107. In Step S1109, the image pickup mode setting unit 108 supplies the parameters related to the image size and the frame rate into the sensor 103, thereby setting a method of reading the image signals out of the sensor 103. In Step S1110, the image pickup mode setting unit 108 supplies the parameters related to the image processing method to the image processing unit 104, thereby setting the image processing method into the mage processing unit 104.

As described above, the image pickup device of the present embodiment is adapted to select an image pickup mode based on at least one of the image size and the frame rate so as to select at least one image output unit from the plural image output units in accordance with the selected image pickup mode so that the selected one image output unit will actually output the image signals. The image pickup device does not use any image output units that are dedicated to output high definition image signals. The image pickup device is adapted to use the general purpose image output units that have a limited available range of data output rate per unit time and select an appropriate number of the image output units for every image pickup mode so that the selected image output units output the image signals. The image pickup device can be realized, which is inexpensive but capable of selecting the image pickup mode.

In accordance with an aspect of the present invention, any image output units are not used, which are dedicated to output high definition image signals. The general purpose image output units are used, which have the limited available range of data output rate per unit time so that an appropriate number of the image output units is selected for every image pickup mode so as to output units output the image signals. The image pickup device can be realized, which is inexpensive but capable of selecting the image pickup mode.

In accordance with another aspect of the present invention, any storage units are not used, which are dedicated to store high definition image signals at a high speed. The image pickup device is adapted to use the general purpose storage units and select an appropriate number of the storage units for every image pickup mode so that the selected storage units store the image signals. The image pickup device can be realized, which is inexpensive but capable of selecting the image pickup mode.

In accordance with still another aspect of the present invention, any image input units are not used, which are dedicated to receive inputs of high definition image signals. The image pickup device is adapted to use the general purpose image input units that have a limited available range of data input rate per unit time and select an appropriate number of the image input units for every image pickup mode so that the selected image input units receive inputs of the image signals. The image pickup device can be realized, which is inexpensive but capable of selecting the image pickup mode.

Second Embodiment

A second embodiment of the present invention will be described. The second embodiment provides an image recording apparatus that records, in a recording medium, the image signals that have been outputted from the above-described image pickup device of the first embodiment.

Figure 12:
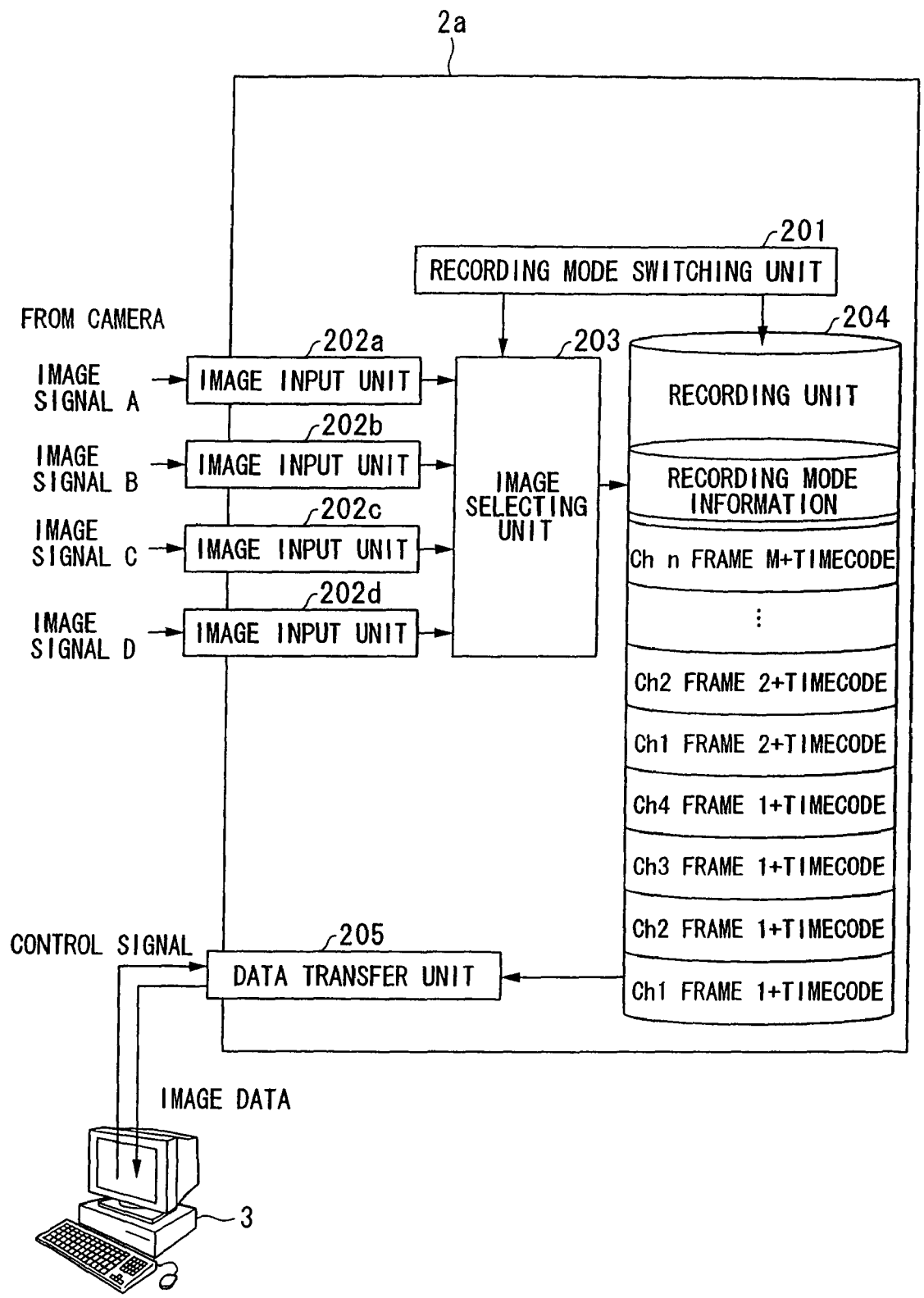
FIG. 12 is a block diagram illustrating another configuration of an image recording apparatus in accordance with a second embodiment of the present invention.

The image recording apparatus may include a recording mode selecting unit, a plurality of image input units, an input selecting unit, a recording unit, and a data transfer unit. The image recording apparatus can be realized by a recorder 2a, for example. FIG. 12 illustrates a typical example of the recorder 2a that acts as an image recording apparatus. The recorder 2a may include a recording mode switching unit 201 that acts as a recording mode selecting unit 201, a plurality of image input units 202a-202d, an input selecting unit 203, a recording unit 204, and a data transfer unit 205. The input selecting unit may comprise the input selecting unit 203 and a function of the recording mode selecting unit 201 to select or determine at least one image input unit that will actually receive the image signal.

The recording mode switching unit 201 selects, based on users' instructions, a recording mode from a predetermined plurality of recording modes that are different from each other in at least one of the image size and the frame rate. The recoding mode is defined by at least one of the image size and the frame rate. A user may operate switches or keys to generate a signal, based on which the recording mode selecting unit 201 recognizes the users' instruction to select the recording mode. The recording mode selecting unit 201 supplies the setting parameters that represent the selected recording mode to the input selecting unit 203 and the recording unit 204. The recording mode selecting unit 201 switches or selects the recording mode and set each element to perform in the selected recording mode.

The image signals A, B, C, and D are inputted into the image input units 202a-202d, respectively. The image input units 202a-202d are conformed to a general purpose interface regulation for image signal output, such as HD-SDI, NTSC, and DVI. In FIG. 12, the four image input units 202a-202d are illustrated. The number of the plural mage input units 202 should not be limited. The input selecting unit 203 selects at least one image input unit from the image input units 202a-202d in accordance with the selected recording mode so that the selected at least one image output unit will actually receive an input of the image signal. A process for selecting the image input unit is the same as the above-described process for selecting the image output unit. The input selecting unit can be realized by the input selecting unit 203 and the function of the recording mode selecting unit 201 to select or determine the at least one image input unit that will actually receive the image signal. The image signal or signals are inputted into at least one image input unit 202 that has been selected by the input selecting unit 203.

The recording unit 204 may include a recording medium that stores the image signals, a circuit that reads and writes the image signals to the medium, and a control unit that controls the circuit. The medium may include, but is not limited to, a semiconductor memory, a hard disk drive, and a tape medium. The image signals may be stored sequentially in a medium that is responsible to a high speed recoding. Similarly to a RAID system, the image signals may alternatively be stored in parallel in the medium that is not responsible to the high speed recoding. A recording mode information and an image information are recorded in the medium of the recording unit 204 one frame by one frame. The recoding mode information may include an address at which an image signal is stored, and a recoding mode in which the image signal is stored, as well as a channel to which the image signal belongs. The recording mode may include the image size and the frame rate. The channel means a channel that is connected to the image input unit one to one for transmission of the image signal. The image information may include a channel number, a frame number, a time code, and image data.

The data transfer unit 205 provides a communication interface that transfers image data stored in the recording unit 204 to an editing system 3. The regulation of the interface applied to the data transfer unit 205 may be general purpose interface regulations such as Fiber Channel, Gigabit Ether, IEEE1394, and USB. The editing system 3 can be realized by a personal computer that edits the image data. The editing system 3 reconstructs the image data with reference to the time code that is added to the image signal. The reconstruction of the image signal may include, but is not limited to, rearranging image signals in accordance with the time codes, and pasting image signals together, which have the same time code.

The above-described configuration of the image recording apparatus may ensure that the image signal which has been outputted from the above-described image pickup device be recorded as image data in the recording medium, and the recorded image data are read out of the recording medium and edited by the editing system 3.

Figure 13:
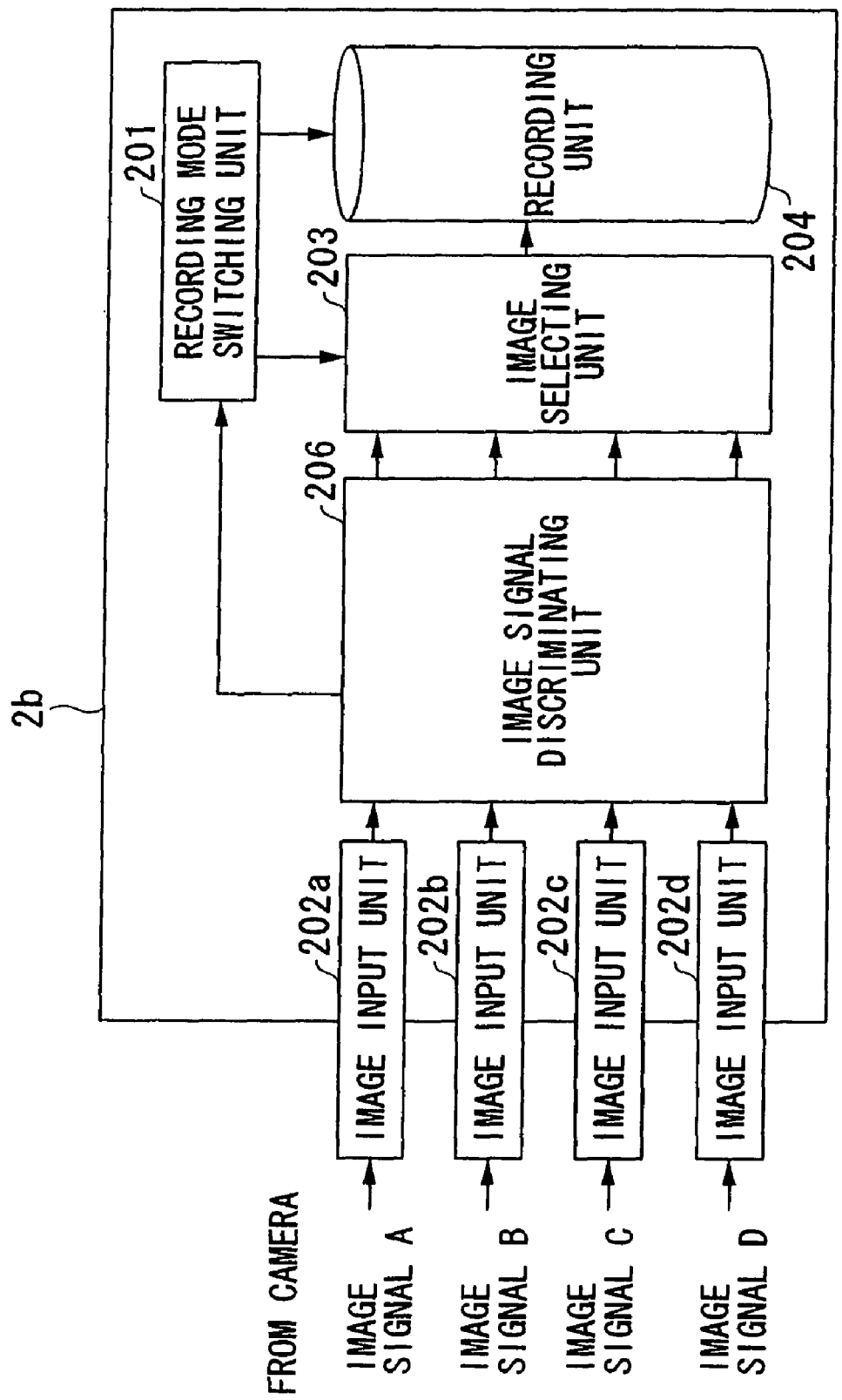
FIG. 13 is a block diagram illustrating another configuration of an image recording apparatus in accordance with a first modification of the second embodiment of the present invention.

A first modification of the second embodiment will be described. FIG. 13 illustrates the first modification of the second embodiment. The image recording apparatus in accordance with the first modification of the second embodiment can be realized by a recorder 2b which is different from the above-described recorder 2a in view of further including an image signal discriminating unit 206 that acts as a part of the recording mode selecting unit. The image signal discriminating unit 206 detects the presence or absence of the image signals A, B, C, and D to be inputted into the image input units 202a, 202b, 202c and 202d, respectively. When the image signal or signals are inputted into the image input unit or units 202, the image signal discriminating unit 206 ascertains the image size and the time code of the image signal as inputted so as to discriminate or determine the recording mode. The image signal discriminating unit 206 uses the time code to discriminate or determine the frame rate. This discrimination or determination may be made by referring plural frames of the image signal. In this case, the image signal may be stored in an image memory that is not illustrated. It is possible as a modification for the camera connected to the recorder 2b to have an ancillary data area for time code that stores the predetermined sets of information, namely, the image pickup mode, the image size, the frame rate and the frame number so as to enable the image signal discriminating unit 206 to discriminate or determine the recording mode based on the predetermined sets of information. The image signal discriminating unit 206 notifies the discriminated recording mode to the recording mode switching unit 201.

The recording mode switching unit 201 supplies setting parameters that represent the notified recording mode to the input selecting unit 203 and the recording unit 204 so as to allow an user to be free from the need to determine an image pickup method and set the recorder to be adapted to the determined method.

Figure 14:
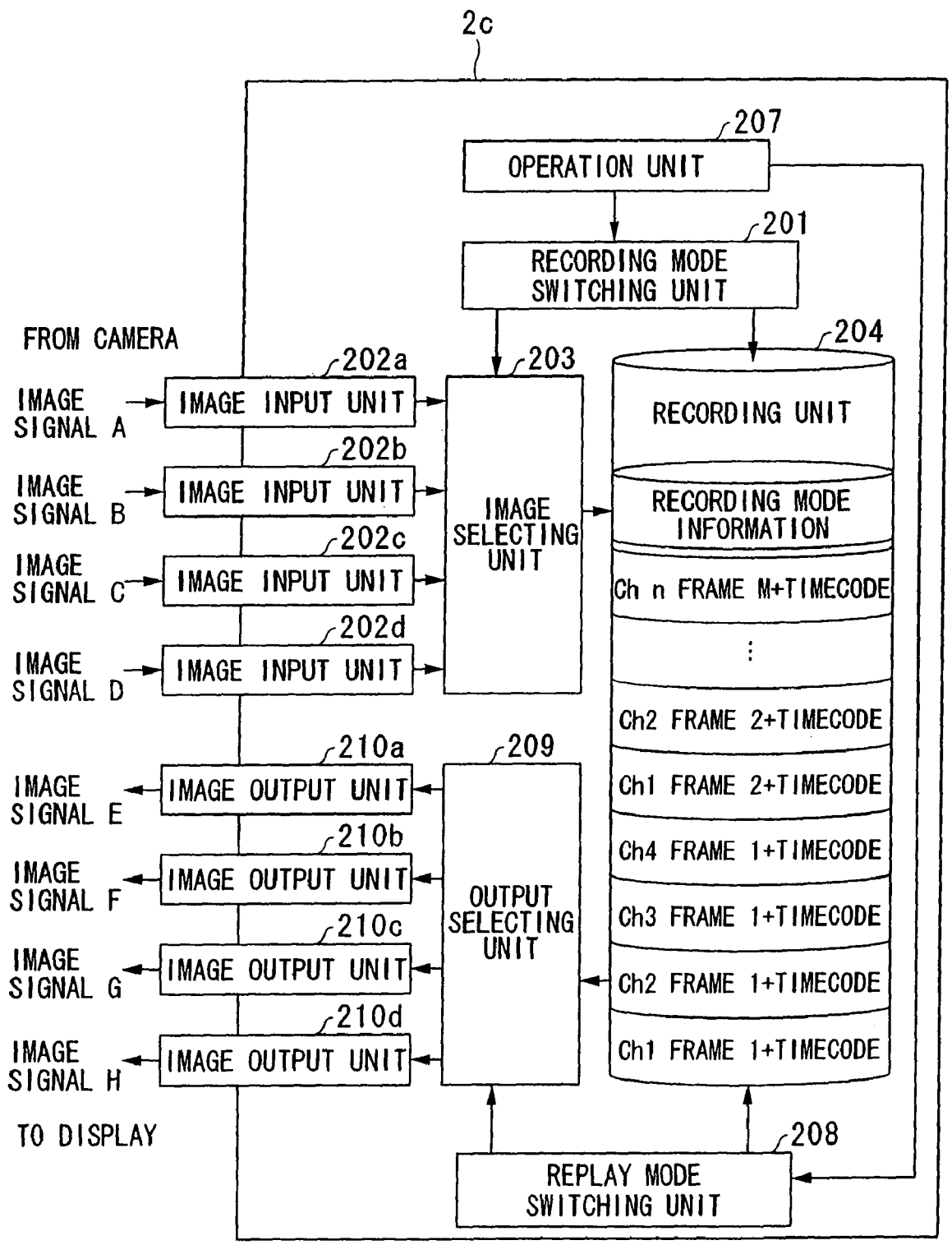
FIG. 14 is a block diagram illustrating still another configuration of an image recording apparatus in accordance with a second modification of the second embodiment of the present invention.

A second modification of the second embodiment will be described. FIG. 14 illustrates the second modification of the second embodiment. The image recording apparatus can be realized by a recorder 2c. The recorder 2c is different from the above-described recorder 2a in view of further including an operation unit 207, a replay mode switching unit 208, an output selecting unit 209, and a plurality of image output units 210a-210d. The plurality of image output units 210a-210d output image signals E, F, G, and H, respectively.

The operation unit 207 has switches and keys to be operated by a user. The operation unit 207 notifies the users' instructions to the recording mode switching unit 201 and the replay mode switching unit 208. The users' instructions may include, but are not limited to, starting and stopping the record and the reply. The operation unit 207 enables a user to select the image size and the frame rate. The recording mode switching unit 201 and the replay mode switching unit 208 discriminate or determine the recording mode and the replay mode, respectively, based on the image size and the frame rate, both of which have been notified by the operation unit 207. The image size and the frame rate establish one-to-one correspondences between the recording modes and the replay modes.

The replay mode switching unit 208 supplies the setting parameters that represent the selected replay mode to the output selecting unit 209. The output selecting unit 209 selects at least one image output unit from the plurality of the image output units 210a-210d in accordance with the selected replay mode so that the selected at least one image output unit will actually output the image signal. The method of selecting the image output unit in accordance with this embodiment is the same as the above described method of selecting the image output unit in accordance with the first embodiment. The output selecting unit 209 selects at least one image output unit 210 and supplies the image signal to the selected at least one image output unit 210.

The image signal is outputted from the selected at least one image output unit 210 and transmitted to a display that is placed outside the recorder.

The above-described configuration of the recorder 2c replays the image signal that has been recorded in the medium.

Figure 15:
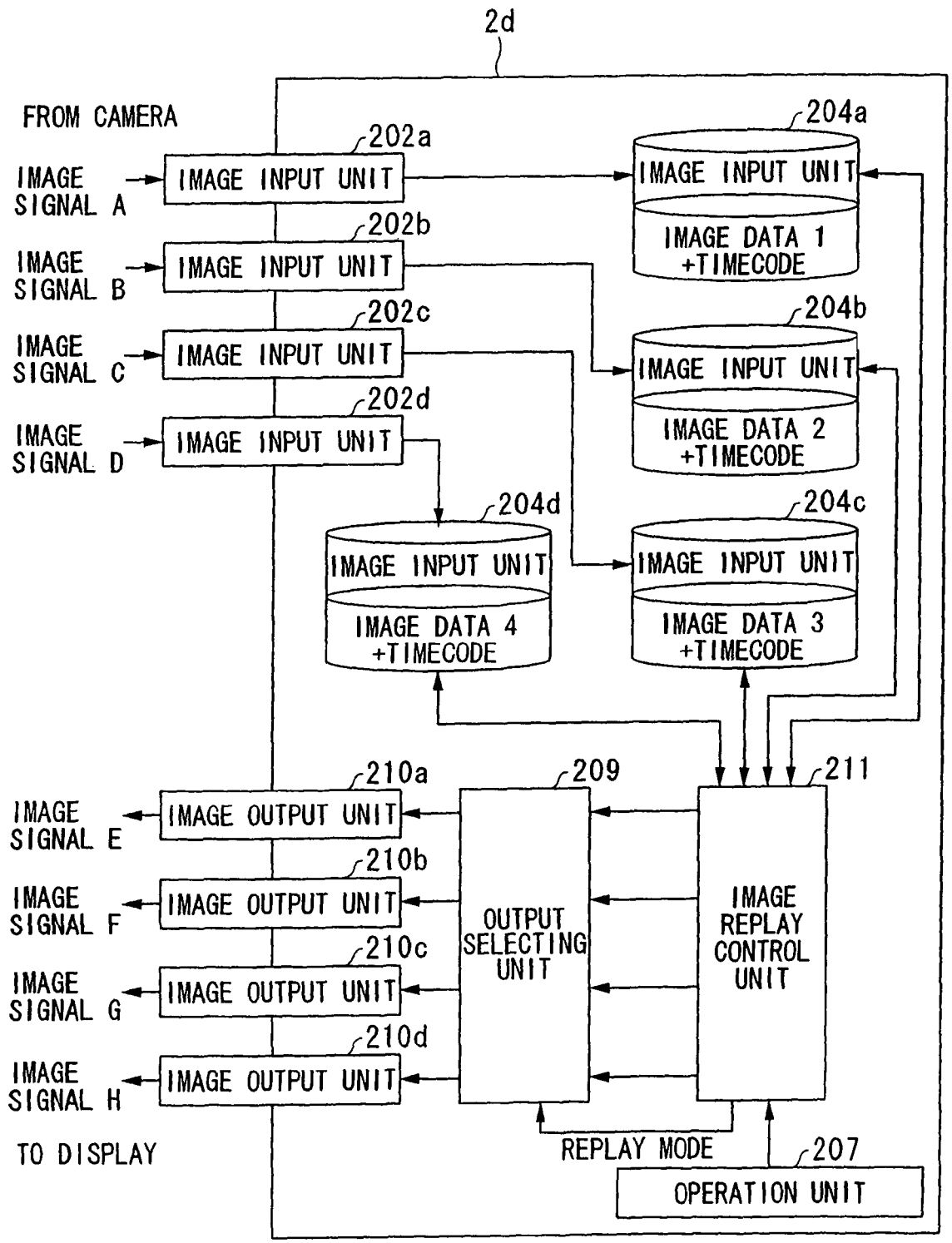
FIG. 15 is a block diagram illustrating yet another configuration of an image recording apparatus in accordance with a third modification of the second embodiment.

A third modification of the second embodiment will be described. FIG. 15 illustrates the third modification of the second embodiment. The image recording apparatus can be realized by a recorder 2d that is different from the above-described recorder 2c in view of further including four recording units 204a-204d and an image replay control unit 211 while excluding the recording mode switching unit 201, the input selecting unit 203 and the replay mode switching unit 208. The recording units 204a-204d are provided to record image signals A, B, C, and D that have been inputted into the image input units 202a, 202b, 202c and 202d, respectively.

Image data of each frame are recorded together with the time code in the media of each of the recording units 204a-204d. The recorder 2d has no input selecting unit. The image signals A, B, C, and D are inputted into the image input units 202a, 202b, 202c and 202d and then recorded in the recording units 204a, 204b, 204c and 204d, respectively. No provision of the input selecting unit can realize a cost reduction of the image recording apparatus. The image replay control unit 211 is provided to replay the image signals with reference to a set of information related to the recording mode.

Once the image replay control unit 211 receives, from the operation unit 207, an input of replay instructions to replay the image data, the image replay control unit 211 accesses the recording units 204a-204d so as to check the image data and the time code for each frame that are stored. The image replay control unit 211 detects the image size of the image data and also detects the frame rate based on the time code of each frame so that the image replay control unit 211 decides an image replay method such as a replay mode that defines the number of at least one image output unit that will actually output the image signal in accordance with the detected image size and frame rate. The image replay control unit 211 sets the output selecting unit 209 to perform selection in the decided image replay method.

Recording mode information may be stored in the recording units 204a-204d together with the image data and the time code. In this case, the image replay control unit 211 decides the image replay method in accordance with the recording mode information. It is also possible as a modification for the recorder 2d to include the above-described input selecting unit that selects at least one image input unit 202 that will actually receive an input of the image signal.

FIG. 16A illustrates an example of recording of the image data of the 4k image size of 4096×2160 and the frame rate of 60 fps, wherein the image data are picked up in the 4k image pickup mode. The image data is divided into four divided sets of image data, each set having the image size of 2048×1080 so that the four divided sets of image data are stored in the recording units 204a-204d, respectively. The divided sets of the image data which are stored in the recording units 204a-204d are given the same series of time codes. If the image replay control unit 211 detects that the four recording units 204a-204d store the four divided sets of the image data, each of which has the same image size of 2048×1080 and the same frame rate of 60 fps and that the four recording units 204a-204d store the same series of time codes, then the image replay control unit 211 recognizes that the image size and frame rate of the recording mode are 4k and 60 fps. Upon the decision, the image replay control unit 211 further decides that the selected four image output units 210a-210d will output four image signals E, F, G and H simultaneously or synchronously one frame by one frame.

FIG. 16B illustrates frames 1, 2, . . . , n of each of the four divided sets of image signals E, F, G, and H that are, respectively, outputted from the selected four image output units 210a-210d. As shown in FIG. 16B, for every frame, the four divided sets of image signals E, F, G, and H are simultaneously or synchronously outputted from the selected four image output units 210a-210d. The image replay control unit 211 reads out the image signals from the recording units 204a-204d and outputs the image signals to the image output units 210a-210d, respectively, which have been selected by the output selecting unit 209. For every frame, the time code is the same among the four image signals to be outputted. It is possible as a modification to use other image signals of the SHD image size of 3840×2160, wherein each of the four divided sets of image signals have an image size of 1920× 1080. The image output units 210a-210d are connected to four displays, respectively, so that the four displays display the four divided sets of image signals, respectively. It is also possible for the image output units 210a-210d to be connected to a single display that is adapted to receive four inputs so that the single display displays a combined image that consists of the four divided images.

Figure 17A:
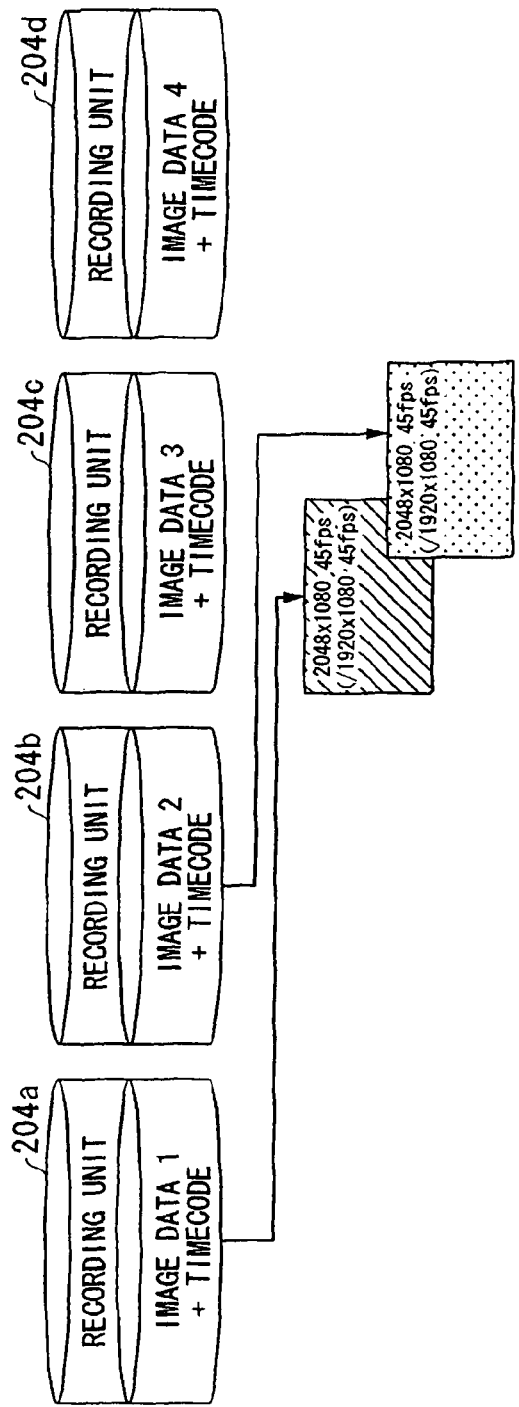
FIG. 17A is a view illustrating an example of recording of image data of a 2k image signal.

FIG. 17A illustrates an example of recording of the image data of the 2k image size of 2048×1080 and the frame rate of 90 fps, wherein the image data are picked up in the 2k image pickup mode. Two recording units 204a and 204b alternately store the image data one frame by one frame. For example, the recording unit 204a may store the image data for odds frames, while the recording unit 204b may store the image data for even frames. A series of time codes given to the image data is different between the recording units 204a and 204b. Each series of time codes defines a frame rate of 45 fps of the image signals. When the image replay control unit 211 has verified that all of the following three conditions are satisfied, then the image replay control unit 211 recognizes that the recording mode is the image size of 2k and the frame rate of 90 fps.

The first condition is that each of the recording units 204a and 204b stores the image data at the image size of 2048× 1080 and at the frame rate of 45 fps.

The second condition is that each time code included in a series of time codes has a time difference from another time code that is closest to the each time code and included in another series of time codes, and the time difference corresponds to a time of one frame, for example, 1/90 seconds, and the series of time codes including the each time code is stored in one of the recording units 204a and 204b, and the other series of time codes including the closest time code is stored in another of the recording units 204a and 204b.

The third condition is that any image data that is added with a series of time codes that are close to the time codes stored in the recording units 204a and 204b is absent in the recording units 204c and 204d.

If the image replay control unit 211 has recognized that all of the above-described three conditions are satisfied, then the image replay control unit 211 decides that the image output unit 210a will read out the image signals from the recording units 204a and 204b alternately and one frame by one frame so as to output the image signals as read out.

Figure 17B:
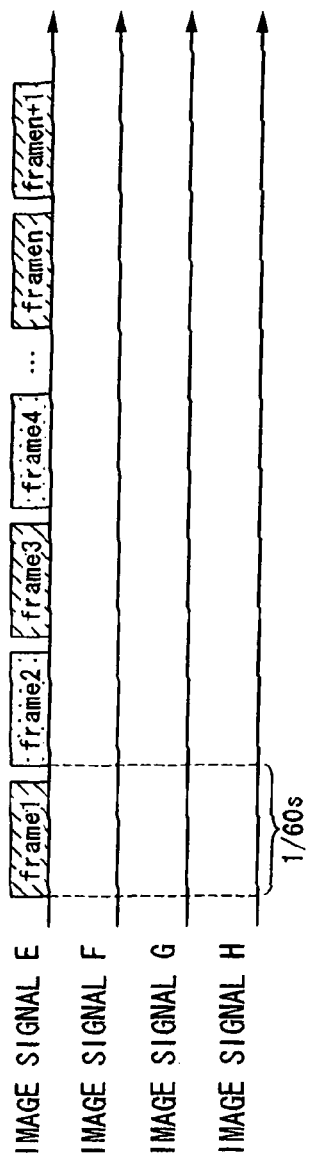
FIG. 17B is a view illustrating frames of the image signal to be outputted from the image output unit.

FIG. 17B illustrates frames 1, 2, . . . , n, n+1 of the image signal E to be outputted from the image output unit 210a. As shown in FIG. 17B, the image signals are read out from the recording units 204a and 204b alternately and one frame by one frame and then replayed and outputted. If a band of the image output unit 210a is insufficient, then a slow motion replay will be made. It is also possible to use image signals of the HD image size of 1920×1080.

Figure 18A:
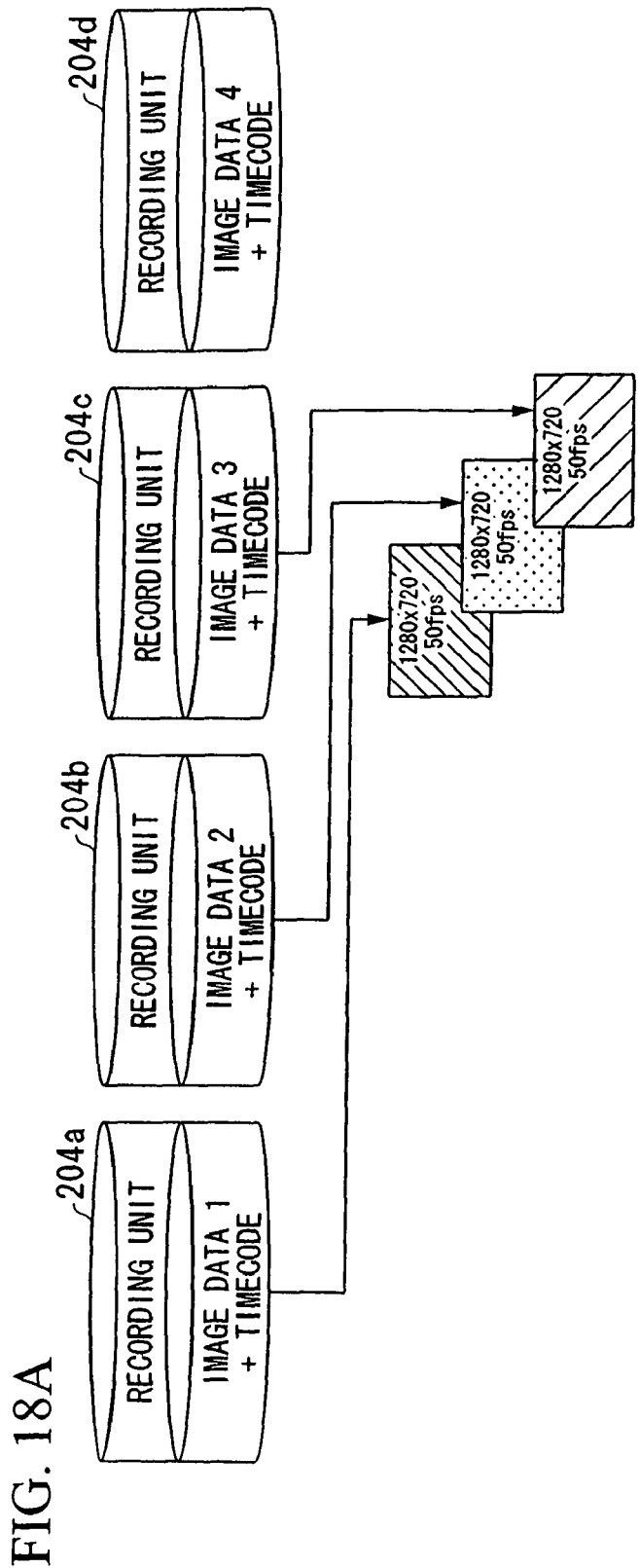
FIG. 18A is a view illustrating an example of recording of image data of a 720p image signal.

FIG. 18A illustrates an example of recording of the image data of the 720 p image size of 1280×720 and the frame rate of 150 fps, wherein the image data are picked up in the 720 p image pickup mode. Three recording units 204a, 204b, and 204c store in turn the image data one frame by one frame. For example, the recording unit 204a may store the image data for a first group of every third frame 1, 4, 7 . . . , n. The recording unit 204b may store the image data for a second group of every third frame 2, 5, 8, . . . , n+1. The recording unit 204c may store the image data for a third group of every third frame 3, 6, 9, . . . , n+2. A series of time codes given to the image data is different among the recording units 204a, 204b, and 204c. Each series of time codes defines a frame rate of 50 fps of the image signals. When the image replay control unit 211 has verified that all of the following four conditions are satisfied, then the image replay control unit 211 recognizes that the recording mode is the image size of 720 p and the frame rate of 150 fps.

The first condition is that each of the recording units 204a, 204b, and 204c stores the image data at the image size of 1280×720 and at the frame rate of 50 fps.

The second condition is that each time code included in a series of time codes has a time difference from another time code that is closest to the each time code and included in another series of time codes, and the time difference corresponds to a time of one frame, for example, 1/150 seconds, and the series of time codes including the each time code is stored in one of the recording units 204a and 204b, and the other series of time codes including the closest time code is stored in another of the recording units 204a and 204b.

The third condition is that each time code included in a series of time codes has a time difference from another time code that is closest to the each time code and included in another series of time codes, and the time difference corresponds to a time of one frame, for example, 1/150 seconds, and the series of time codes including the each time code is stored in one of the recording units 204b and 204c, and the other series of time codes including the closest time code is stored in another of the recording units 204b and 204c.

The fourth condition is that any image data that is added with a series of time codes that are close to the time codes stored in the recording units 204a, 204b, and 204c is absent in the recording unit 204d.

If the image replay control unit 211 has recognized that all of the above-described four conditions are satisfied, then the image replay control unit 211 decides that the image output unit 210a will read out the image signals from the recording units 204a, 204b, and 204c in turn and one frame by one frame so as to output the image signals as read out.

Figure 18B:
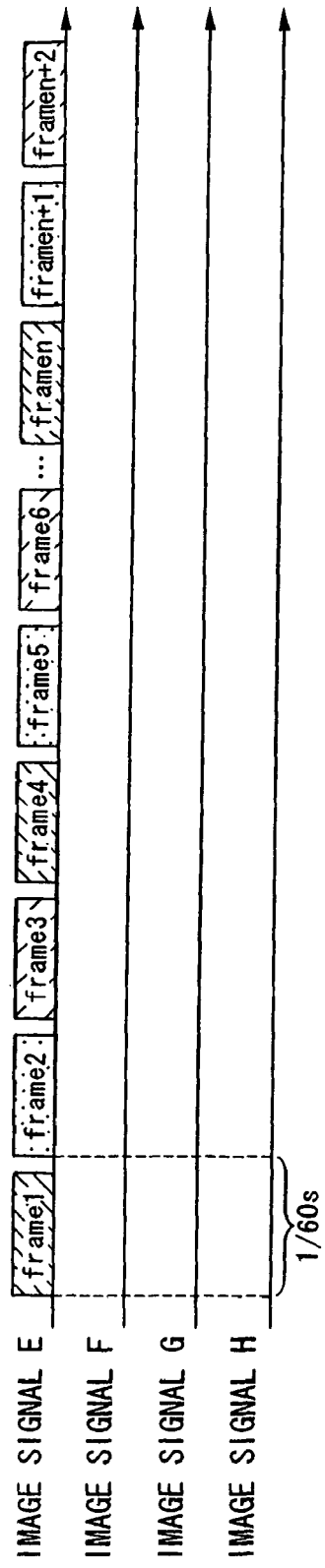
FIG. 18B is a view illustrating frames of the image signal to be outputted from an image output unit.

FIG. 18B illustrates frames 1, 2, . . . , n, n+1, n+2 of the image signal E to be outputted from the image output unit 210a. As shown in FIG. 18B, the image signals are read out from the recording units 204a, 204b, and 204c in turn and one frame by one frame and then replayed and outputted. If a band of the image output unit 210a is insufficient, then a slow motion replay will be made.

As described above, the image recording apparatus of the present embodiment is adapted to select a recording mode based on at least one of the image size and the frame rate. The image recording apparatus is further adapted to select at least one image input unit from the plurality of image input units in accordance with the selected recording mode so that the selected at least one image input unit will actually receive inputs of the image signals. The image recording apparatus does not use any image input units that are dedicated to output high definition image signals. The image recording apparatus is adapted to use the general purpose image input units that have a limited available range of data input rate per unit time and select an appropriate number of the image input units for every recording mode so that the selected image input units receive outputs of the image signals. The image recording apparatus can be realized, which is inexpensive but capable of selecting the recording mode.

Third Embodiment

Figure 19:
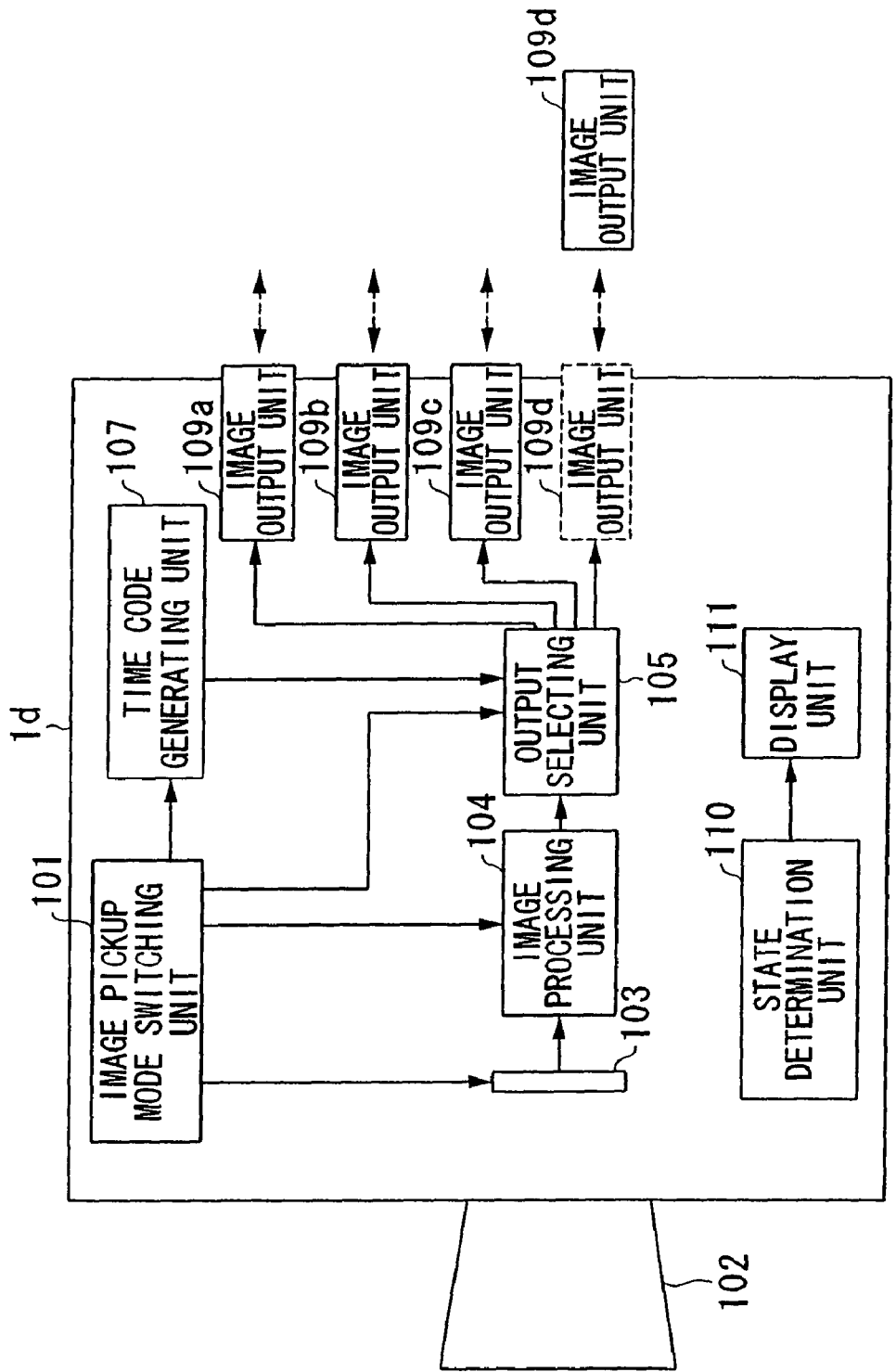
FIG. 19 is a block diagram illustrating a configuration of an image pickup device in accordance with a third embodiment of the present invention.

A third embodiment of the present invention will be described. The third embodiment provides an image pickup device that has not only the same functions as those of the above-described image pickup device of the first embodiment but also an additional function of recording the image signals. The image pickup device can be realized by a recorder-integrated camera 1d. FIG. 19 illustrates a configuration of a camera 1d in accordance with the third embodiment of the present invention. The camera 1d may include an image pickup mode switching unit 101, a lens 102, a sensor 103, an image processing unit 104, an output selecting unit 105, a time code generating unit 107, a plurality of image recording units 109a-109d, a state determination unit 110, and a display unit 111. Each of the image recording units 109a-109d may be realized by any available recording device such as card memory, hard disk drive, and tape medium. Each of the image recording units 109a-109d may be mountable on and removable from the camera 1d so that each of the image recording units 109a-109d may be exchangeable. The camera 1d may have an eject switch so that pushing the eject switch allows each of the image recording units 109a-109d to be removed from the camera 1d.

The output selecting unit 105 is adapted to select at least one image recording unit from the image recording units 109a-109d in accordance with the selected image pickup mode so that the selected at least one image recording unit will actually record the image signals. The record selecting unit of the present invention can be realized by the output selecting unit 105 and a function of the image pickup mode switching unit 101 to determine the number of image outputs, for example, the number of at least one image recording units that will actually record the image signals. When a long time recording is needed, the image signals may be recorded in the image recording units 109a, 109b, 109c and 109d sequentially or in order of the image recording units 109a, 109b, 109c and 109d. It may be preferred to exchange the image recording unit that is not in use to record the image signals while the camera 1d is in use to pickup image.

The state determination unit 110 is adapted to determine the states of the camera 1d, namely the states of the image recording units 109a-109d so that the state determination unit 110 controls the display unit 111 to display messages that represent the determined states. The display unit 111 displays the messages such as error message that represent the determined states in accordance with the instructions of the state determination unit 110. When the 4k image recording and pickup, the high speed image pickup or the long time image pickup is requested, a plurality of image recording units such as plural media may be mounted on the camera 1d. When the normal image pickup such as the HD image pickup is requested, a single image recording unit such as a single medium may be mounted on the camera 1d.

Figure 20:
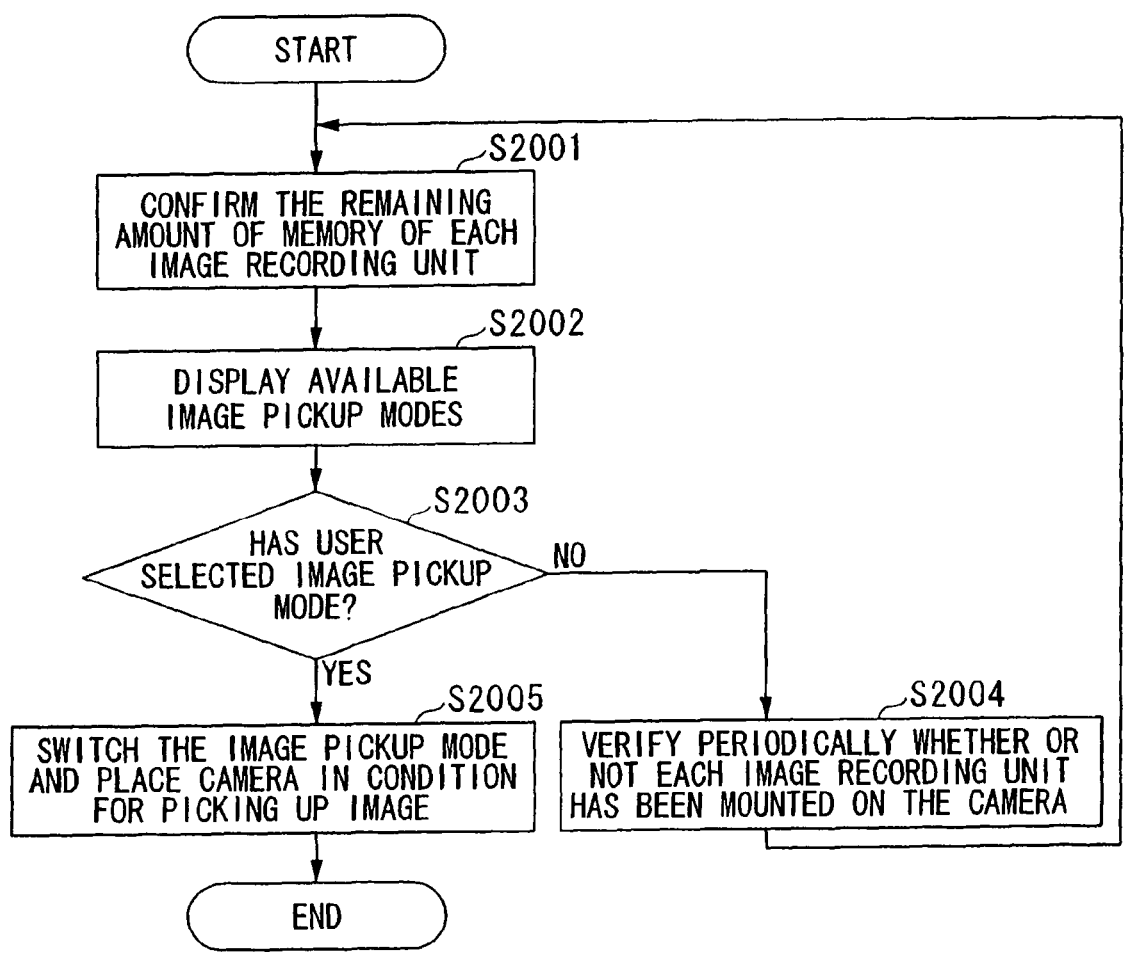
FIG. 20 is a flow chart illustrating operations of an image pickup device after power input is made in accordance with the third embodiment of the present invention.

Operations of the image pickup device of this embodiment will be described. FIG. 20 illustrates operations of the camera 1d after power input is made. In Step S2001, when power input is made, the state determination unit 110 confirms the remaining amount of memory of each of the image recording units 109a-109d. In Step S2002, the display unit 111 displays available image pickup modes so as to enable a user to select an image pickup mode. In Step S2003, the state determination unit 110 monitors a signal that identifies the selected image pickup mode and is inputted into the image pickup mode switching unit so that the state determination unit 110 determines whether or not the selection of the image pickup mode has been made.

When the state determination unit 110 has determined that no selection has been made of the image pickup mode, the process will enter into Step S2004, in which the state determination unit 110 verifies periodically whether or not each of the image recording units 109a-109d has been mounted on the camera 1d. The process will subsequently be returned to the above described Step S2001. When the state determination unit 110 has determined that a selection has been made of the image pickup mode, the process will enter into Step S2005, in which the state determination unit 110 instructs the image pickup mode switching unit 101 to set the image pickup mode. Upon receipt of the instructions of the state determination unit 110, the image pickup mode switching unit 101 supplies setting parameters to the sensor 103, the image processing unit 104, the output selecting unit 105 and the time code generating unit 107 so as to switch the image pickup mode and place the camera 1d in condition for picking up image.

Figure 21:
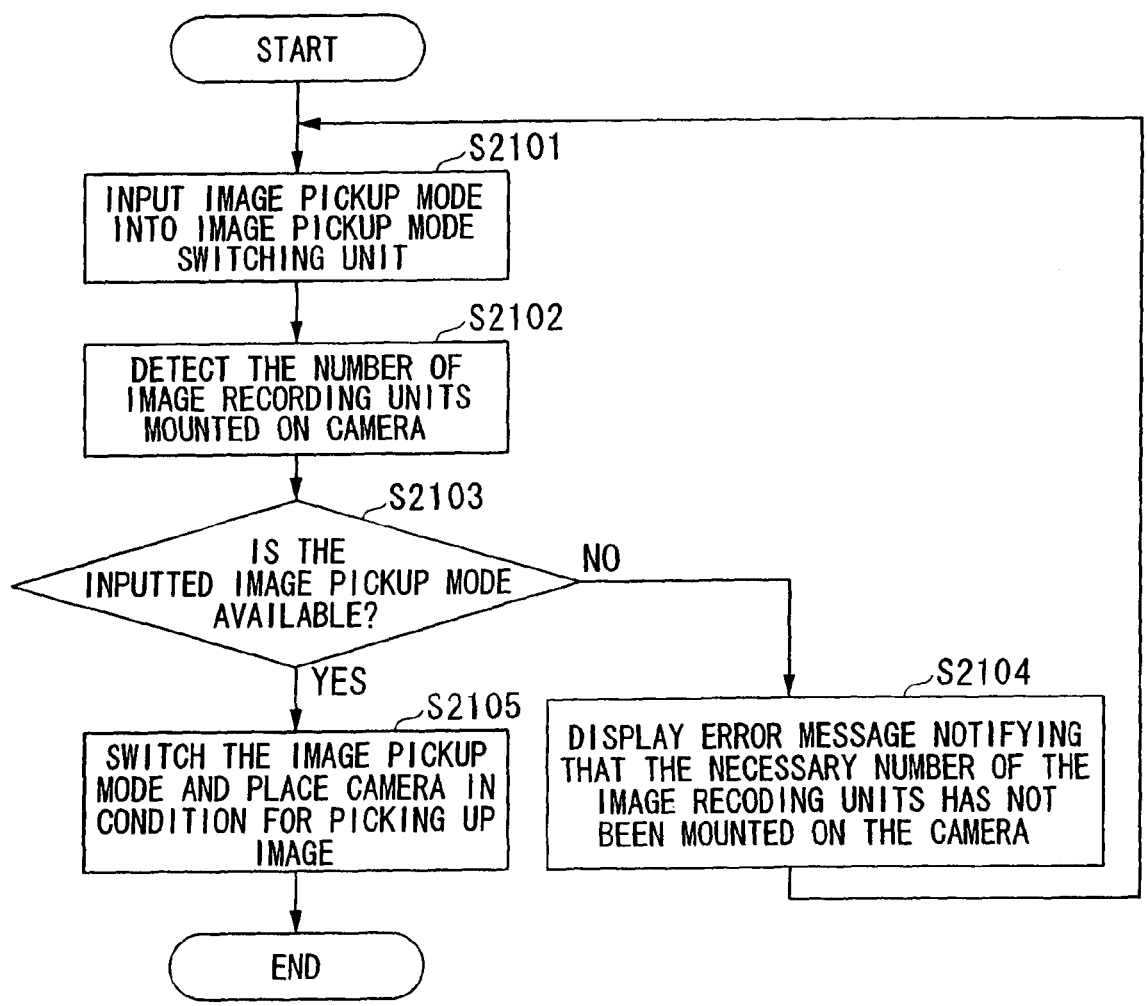
FIG. 21 is a flow chart illustrating operations of the image pickup device to check whether the necessary image recording units have been mounted on the image pickup device for recording the image signals in the image pickup mode selected by the user in accordance with the third embodiment of the present invention.

FIG. 21 is a flow chart illustrating operations of the camera 1d to check whether the necessary image recording units have been mounted on the camera 1d for recording the image signals in the image pickup mode selected by the user. In Step S2101, an image pickup mode is selected by a user and inputted into the image pickup mode switching unit 101. In Step S2102, the state determination unit 110 detects a signal that identifies the input of the image pickup mode into the image pickup mode switching unit 101, and thus the state determination unit 110 determines that the input of the image pickup mode has been made. The state determination unit 110 verifies whether each of the image recording units 109a-109d has been mounted on the camera 1d so as to detect the number of the image recording units 109 as mounted.

In Step S2103, the state determination unit 110 further detects the number of the image recording units 109 that will be used for recording the image signals in the inputted image pickup mode. Namely, the state determination unit 110 detects, from the image pickup mode switching unit 101, the number of image signal outputs to be made. The state determination unit 110 determines whether or not the detected number of image signal outputs to be made exceeds the detected number of the image recording units 109 as mounted on the camera 1d. Namely, the state determination unit 110 determines whether or not the inputted image pickup mode is available. If the state determination unit 110 has determined that the number of the image recording units 109 that will be used for recording the image signals in the inputted image pickup mode does not exceed the number of the image recording units 109 as mounted on the camera 1d, then the state determination unit 110 decides that the inputted image pickup mode is available to pick up the image. If the state determination unit 110 has determined that the number of the image recording units 109 that will be used for recording the image signals in the inputted image pickup mode exceeds the number of the image recording units 109 as mounted on the camera 1d, then the state determination unit 110 decides that the inputted image pickup mode is unavailable to pick up the image.

If the state determination unit 110 has determined that the number of the image recording units 109 that will be used for recording the image signals in the inputted image pickup mode exceeds the number of the image recording units 109 as mounted on the camera 1d and the inputted image pickup mode is unavailable to pick up the image, then the process will enter into Step S2104. In this step, the state determination unit 110 renders the display unit 111 to display an error message notifying that the necessary number of the image recoding units has not been mounted on the camera 1d, thereby allowing a user to mount one or more further image recording units on the camera 1d. The process will then be returned to Step S2101.

If the state determination unit 110 has determined that the number of the image recording units 109 that will be used for recording the image signals in the inputted image pickup mode does not exceed the number of the image recording units 109 as mounted on the camera 1d and the inputted image pickup mode is available to pick up the image, then the process will enter into Step S2105. In this step, the state determination unit 110 instructs the image pickup mode switching unit 101 to set the inputted image pickup mode. Upon receipt of the instructions of the state determination unit 110, the image pickup mode switching unit 101 supplies setting parameters to the sensor 103, the image processing unit 104, the output selecting unit 105 and the time code generating unit 107 so that the camera 1d is placed in condition for picking up image.

Figure 22:
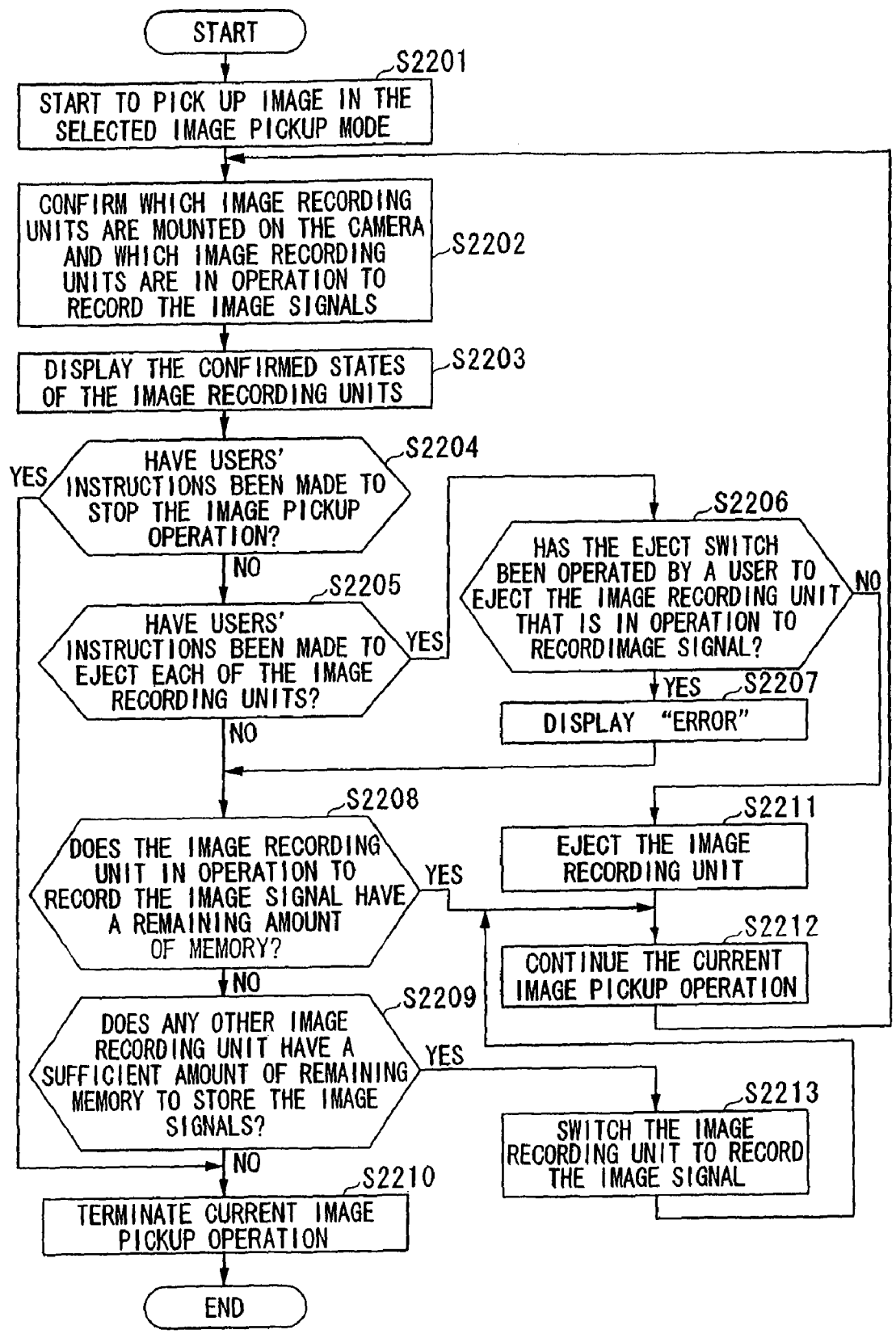
FIG. 22 is a flow chart illustrating operations of the image pickup device to safely exchange the image recording units during image pickup operation in accordance with the third embodiment of the present invention.

FIG. 22 is a flow chart illustrating operations of the camera 1d to safely exchange the image recording units during image pickup operation. In Step S2201, an image pickup mode is selected by a user and inputted into the image pickup mode switching unit 101 so that the camera 1d starts to pick up images in the selected image pickup mode. In Step S2202, the state determination unit 110 determines the states of the image recording units 109. Namely, the state determination unit 110 confirms which image recording units 109a-109d are mounted on the camera 1d and which image recording units 109a-109d are in operation to record the image signals. In Step S2203, the state determination unit 110 instructs the display unit 111 to display the confirmed states of the image recording units 109a-109d.

In Step S2204, the state determination unit 110 monitors a signal that provides instructions to stop the image pickup operation so as to determine whether or not the users' instructions have been made to stop the image pickup operation of the camera 1d. If the state determination unit 110 has determined that the users' instructions were made to stop the image pickup operation, then the process will enter into Step S2210 and the image pickup operation is finished. If the state determination unit 110 has determined that no users' instructions were made to stop the image pickup operation, then the process will enter into Step S2205. The state determination unit 110 monitors a signal that is generated upon operating eject switches for ejecting the image recording units 109a-109d so that the state determination unit 110 determines whether or not users' instructions have been made to eject or remove each of the image recording units 109a-109d. If the state determination unit 110 has determined that the eject switch was operated for at least one image recording unit 109, the process will enter into Step S2206. If the state determination unit 110 has determined that the eject switch was not operated for every image recording unit 109, the process will enter into Step S2208.

In Step S2206, the state determination unit 110 determines whether or not the eject switch has been operated by a user to eject or remove the image recording unit that 109 is now in operation to record image signals. If the state determination unit 110 has determined that the eject switch has been operated to eject or remove the image recording unit 109 that is now in operation to record image signals, then in Step S2207, the state determination unit 110 instructs the display unit 111 to display "error" and prevent that the image recording unit 109 that is now in operation to record image signals from being ejected or removed. The process will subsequently enter into Step S2208. If the state determination unit 110 has determined that the eject switch has been operated to eject or remove the image recording unit 109 that is not in operation to record image signals, then in Step S2211, the image recording unit 109 is ejected or removed. The process will enter into Step S2212, in which the camera 1d continues the current image pickup operation. The process will then be back to Step S2202.

In Step S2208, the state determination unit 110 determines whether or not the image recording unit 109 that is in operation to record the image signal has a remaining amount of memory. If the state determination unit 110 has determined that the image recording unit 109 that is in operation to record the image signal has a remaining amount of memory yet, then the process will enter into Step S2212 and the current image pickup operation will be continued and then the process will be back to Step S2202. If the state determination unit 110 has determined that the image recording unit 109 that is in operation to record the image signal has no remaining amount of memory, then in Step S2209, the state determination unit 110 confirms remaining amounts of memories of the other image recording units 109 so as to determine whether or not any of the other image recording units 109 has a sufficient amount of remaining memory to store the image signals.

If the state determination unit 110 has determined that the other image recording unit 109 has a sufficient amount of remaining memory to store the image signals, then in Step S2213, the original recording operation by the original image recording unit 109 is discontinued while the subsequent or further recording operation by the other image recording unit 109 is commended, thereby switching the image recording unit to record the image signal. The process will enter into Step S2212 and the image pickup operation will be continued. The process will then be back to Step S2202. If the state determination unit 110 has determined that the other image recording unit 109 does not have the remaining amount of memory that is needed to store the image signals, then the process will enter into Step S2210 and the current image pickup operation is terminated.

Figure 23:
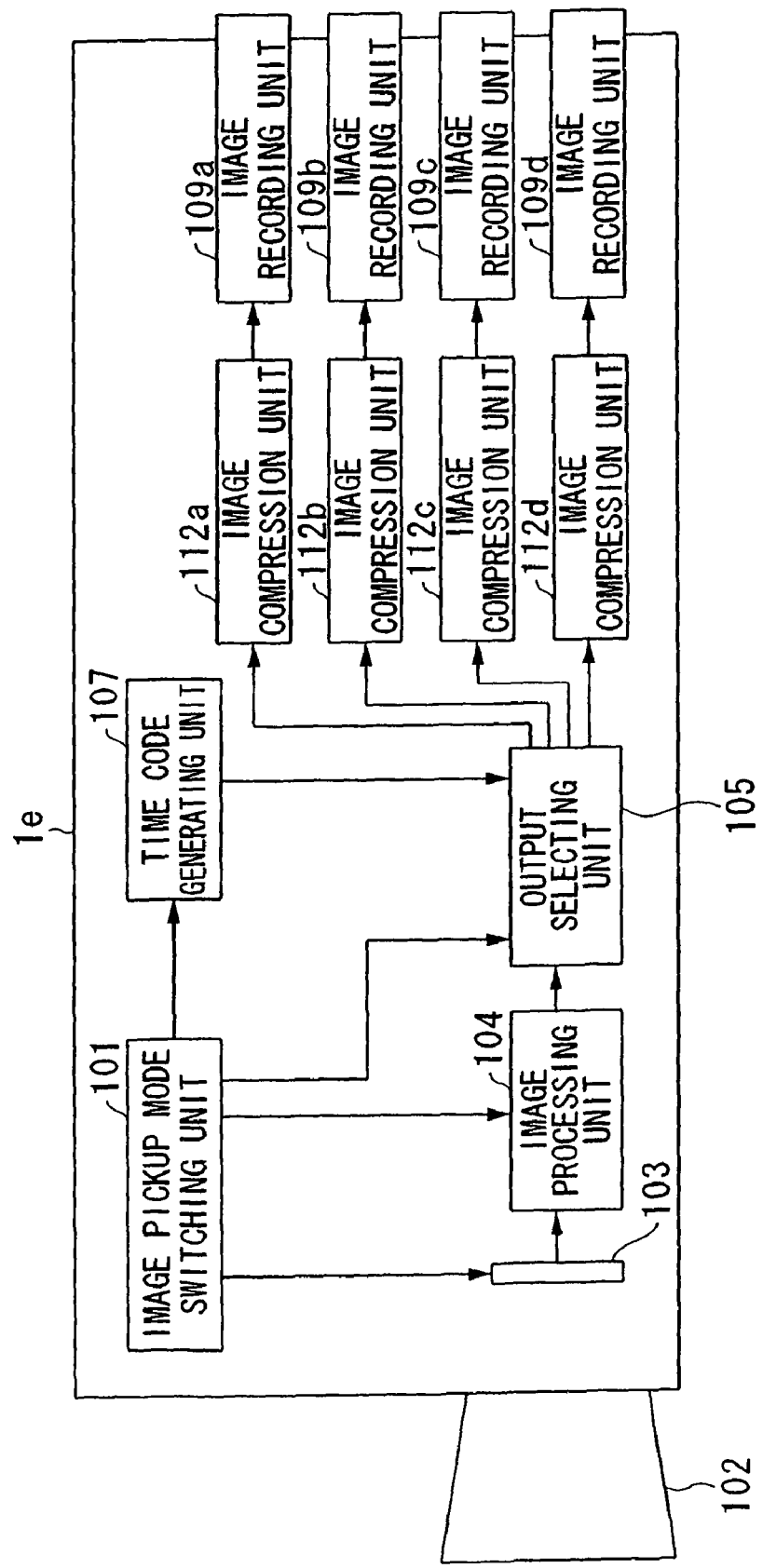
FIG. 23 is a block diagram illustrating a configuration of an image pickup device in accordance with a first modification of the third embodiment of the present invention.

A first modification of the third embodiment will be described. FIG. 23 illustrates the first modification of the third embodiment. An image pickup device in accordance with the first modification of the third embodiment has not only the same functions as those of the image pickup device of the first embodiment but also an additional function of recording image signals. The image pickup device can be realized by a recorder-integrated camera 1e. The camera 1e is different from the above-described camera 1d in view of further including a plurality of image compression units 112a-112d and excluding the above-described state determination unit 110 and the display unit 111. The image compression units 112a-112d perform image compression processes for image signals that have been outputted from the output selecting unit 105. Typical examples of the image compression process may include, but are not limited to, JPEG2000, Motion JPEG, MPEG, and DCT. It is preferable that the number of the image compression units is the same as the number of channels of the image signals that are outputted from the output selecting unit 105. The image compression units 112a-112d supply compressed image signals to the image recording units 109a-109d, respectively, so that the image recording units 109a-109d record the compressed image signals.

Figure 24:
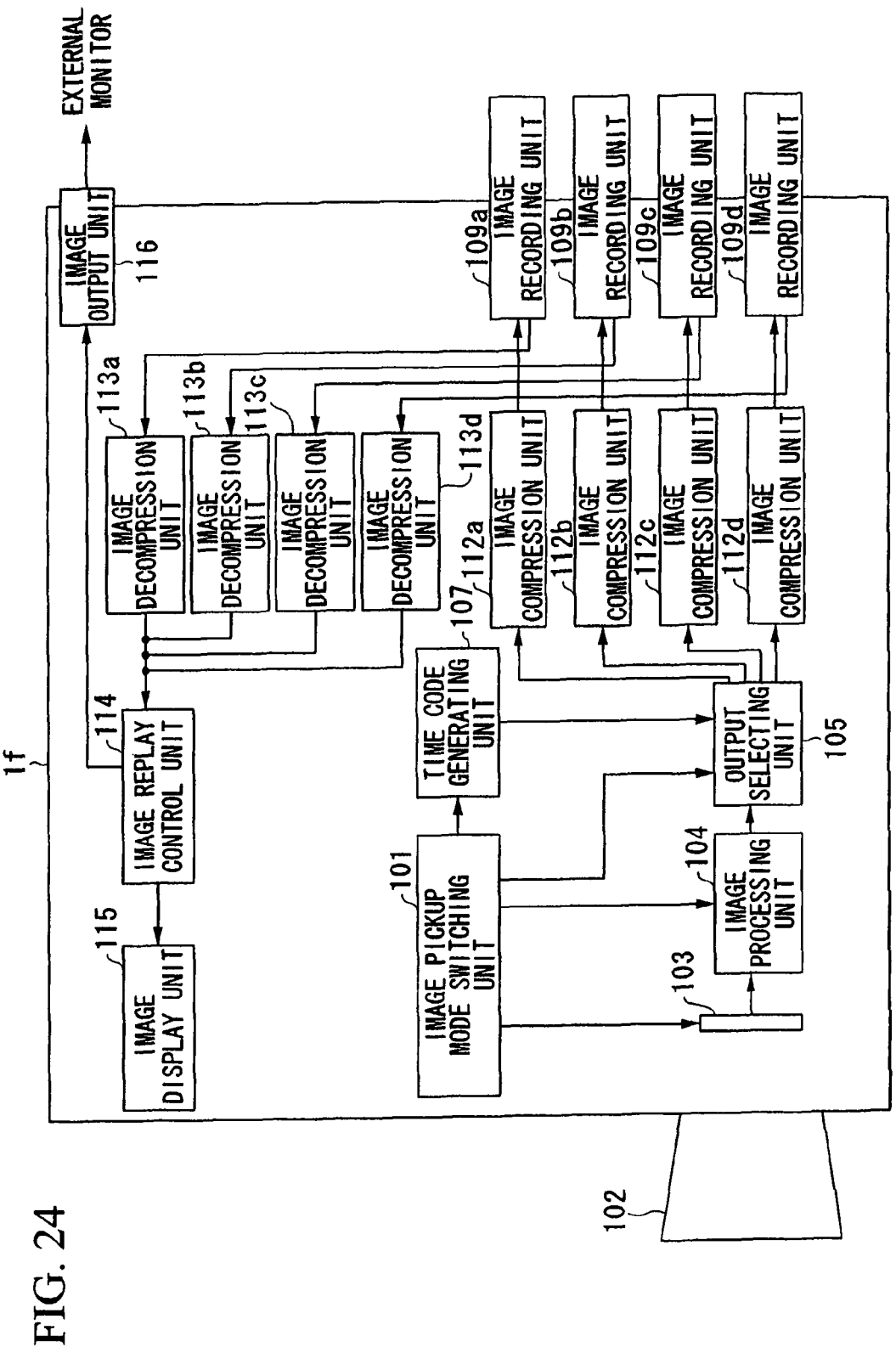
FIG. 24 is a block diagram illustrating a configuration of an image pickup device in accordance with a second modification of the third embodiment of the present invention.
Figure 25:
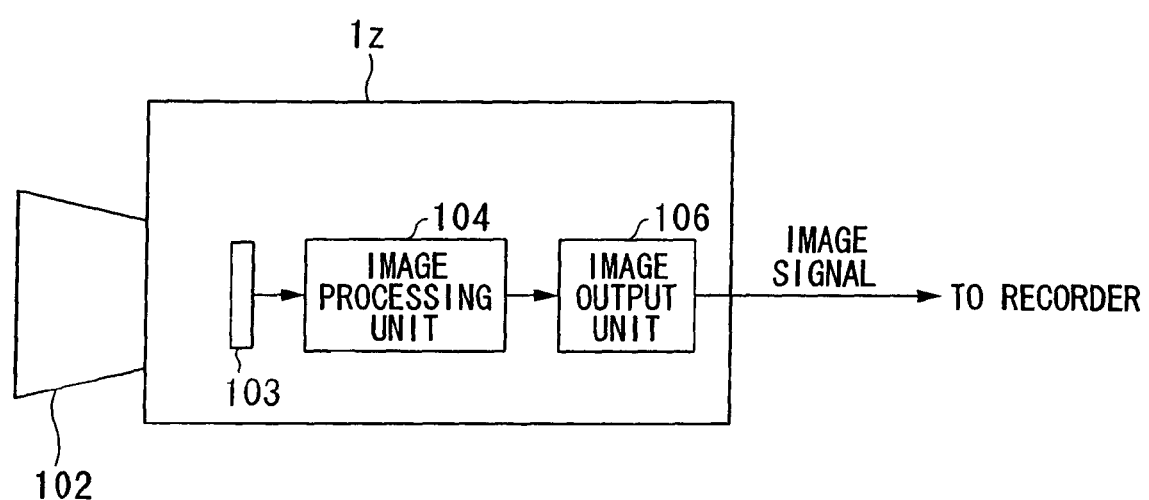
FIG. 25 is a block diagram illustrating a configuration of a conventional image pickup device.

A second modification of the third embodiment will be described. FIG. 24 illustrates the second modification of the third embodiment. An image pickup device in accordance with the second modification of the third embodiment has not only the same functions as those of the image pickup device of the first embodiment but also an additional function of recording image signals. The image pickup device can be realized by a recorder-integrated camera 1f. The camera 1f is different from the above-described camera 1e in view of further including a plurality of image decompression units 113a-113d, an image replay control unit 114, an image display unit 115, and an image output unit 116. The image compression units 112a-112d perform image compression processes for image signals that have been outputted from the output selecting unit 105. The image compression units 112a-112d supply the compressed image signals to the image recording units 109a-109d so that the image recording units 109a-109d record the compressed image signals. The image decompression units 113a-113d perform image decompression processes or image extension processes for the compressed image signals that have been stored in the image recording units 109a-109d, respectively. The image decompression process is opposite to the compression process such as JPEG2000, Motion JPEG, MPEG, or DCT. The image replay control unit 114 receives inputs of the image signals that have been decompressed or extended by the image decompression units 113a-113d. It is preferable that the number of the image decompression units 113a-113d is the same as the number of the channels of the image signals that are outputted from the image recording units 109a-109d.

The image replay control unit 114 controls the supply of the image signals to the image display unit 115 and to the image output unit 116. The image display unit 115 may be realized by an EVF (electron view finder) that displays images based on the image signals, for example, liquid crystal display devices, CRTs and organic EL devices. The image output unit 116 receives the image signals from the image replay control unit 114 and supplies the image signals to an external monitor that is placed outside the camera 1f.

If the resolution of the image display unit 115 is lower than the resolution of an image given by the image signal that has been supplied from the image processing unit 104, then the image replay control unit 114 converts the original resolution to a lower resolution or slices the image. For example, if the resolution of the image display unit 115 corresponds to the resolution of the HD image, then the image signal stored in the recording mode of the 4k image size and the 60 fps frame rate may be replayed by thinning pixels while keeping a full angle of view or by slicing the image signal. If the image signal is stored in the recording mode of the HD image size and the 90 fps frame rate or the other recording mode of the 720p image size and the 150 fps frame rate, then a low motion replay of the image signal is available.

In accordance with this embodiment, the image pickup device is adapted to select an image pickup mode based on at least one of the image size and the frame rate and further select at least one image recording unit from the plurality of image recording units in accordance with the selected image pickup mode so that the at least one image recording unit will actually record the image signal. This configuration of the image pickup device permits the use of general purpose image recording units instead of the image recording units that are dedicated to record high definition image signals at a high speed. An appropriate number of the image output units is selected for every recording mode so as to record the image signals. The image pickup device can be realized, which is inexpensive but capable of selecting the image pickup mode.

A plurality of the image compression units 112a-112d are provided to compress the image signal that has been outputted from the output selecting unit 105. The configuration of the image pickup device permits the use of general purpose image compression units instead of the image compression units that are dedicated to compress the high definition image signal. This can realize a desired inexpensive image pickup device. Further, a plurality of the image decompression units 113a-113d are provided to decompress the compressed image signals that are stored in the image recording units 109a-109d. The configuration of the image pickup device permits the use of general purpose image decompression units instead of the image decompression units that are dedicated to decompress the compressed high definition image signal. This can realize a desired inexpensive image pickup device.

The above embodiments utilize the three fixed frame rates, for example, 60 fps, 90 fps and 150 fps. An available frame rate for picking up or recording image signals should not be limited to the above fixed frame rates, but may be in a range of 1-60 fps, another range of 60-90 fps and still another range of 90 fps or more. It is also possible to vary the frame rate in the range of 1-60 fps, the other range of 60-90 fps and the other range of 90 fps or more. It is further possible to change, if any, the number of the image output units that are in use or operation to output the image signals upon change of the frame rate during the image pickup operation.

As used herein and the amended claims, typical examples of the fixed phrase "function to process the image signal" include, but are not limited to, function to input, output, record or other process the image signal.

The term "unit" is used to describe a component, section or part of a device, and includes, but is not limited to, hardware and/or software that is constructed and/or programmed to carry out the desired function.

Typical examples of "operational mode" may typically include image pickup mode, recording mode and modes that are substantially equivalent to those modes.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image pickup device comprising:
   an image pickup element that picks up an image of an object so as to generate an image signal based on the image of the object;

a plurality of image output units, each of the plurality of image output units being adapted to output the image signal;

an image pickup mode setting unit that sets an image pickup mode based on at least one of an image size and a frame rate; and an output selecting unit that selects at least one image output unit from the plurality of image output units in accordance with the image pickup mode so as to enable the at least one image output unit to actually output the image signal;

wherein the output selecting unit decides the number of the at least one image output unit based on a value given by N×M/D, where D is an upper limit of an available range of data transfer rate per unit time of each of the plurality of image output units, N is the image size, and M is the frame rate.

2. The image pickup device according to claim 1, further comprising:

a time code generating unit that generates, in accordance with the image pickup mode, a time code that is to be added to the image signal.

3. The image pickup device according to claim 1, wherein the output selecting unit selects a minimum number of the at least one image output unit that enables the at least one image output unit to output the image signal in an available range of data transfer rate of the at least one image output unit.

4. An image pickup device comprising:

an image pickup element that picks up an image of an object so as to generate an image signal based on the image of the object;

a plurality of image output units, each of the plurality of image output units being adapted to output the image signal;

an image pickup mode selecting unit that selects an image pickup mode based on at least one of an image size and a frame rate; and an output selecting unit that selects at least one image output unit from the plurality of image output units in accordance with the image pickup mode so as to enable the at least one image output unit to actually output the image signal;

a dividing unit that generates divided sets of sub-image signals that each represent divided sets of sub-images, the divided sets of sub-image signals constituting the image signal that represents the image of the object, wherein the output selecting unit selects the same number of image output units from the plurality of image output units as the divided sets of sub-image signals so that the selected image output units output the divided sets of sub-image signals, wherein if the image size is a 4096×2160 image size, the dividing unit generates four divided sets of sub-image signals that each represent four divided sets of sub-images, and the four divided sets of sub- image signals constitute the image signal that represents the image of the object, and wherein the output selecting unit selects four image output units from the plurality of image output units so that the selected four image output units operate synchronously to output the four divided sets of sub-image signals one frame by one frame, whereby the four divided sets of sub-image signals are all outputted during each frame.

5. The image pickup device according to claim 4, further comprising a time code generating unit that generates, in accordance with the image pickup mode, a time code that is to be added to the image signal.

6. The image pickup device according to claim 4, wherein the output selecting unit selects a minimum number of the at least one image output unit that enables the at least one image output unit to output the image signal in an available range of data transfer rate of the at least one image output unit.

7. The image pickup device according to claim 4, further comprising:

a table that defines a relationship between the image pickup mode and a parameter that is associated with the image pickup mode so as to identify the number of the at least one image output unit, wherein the output selecting unit refers to the table to select the at least one image output unit in accordance with the parameter.

8. An image pickup device comprising:

an image pickup element that picks up an image of an object so as to generate an image signal based on the image of the object;

a plurality of image output units, each of the plurality of image output units being adapted to output the image signal;

an image pickup mode selecting unit that selects an image pickup mode based on at least one of an image size and a frame rate;

an output selecting unit that selects at least one image output unit from the plurality of image output units in accordance with the image pickup mode so as to enable the at least one image output unit to actually output the image signal; and a dividing unit that generates divided sets of sub-image signals that each represent divided sets of sub-images, the divided sets of sub-image signals constituting the image signal that represents the image of the object;

wherein the output selecting unit selects the same number of image output units from the plurality of image output units as the divided sets of sub-image signals so that the selected image output units output the divided sets of sub-image signals, wherein if the image size is a 3072×1620 image size, the output selecting unit selects two image output units from the plurality of image output units so that the selected two image output units operate alternately to output the image signal one frame by one frame and interleaved so that successive frames slightly overlap to maintain an output rate acceptable to the selected two output units.

9. The image pickup device according to claim 8, further comprising a time code generating unit that generates, in accordance with the image pickup mode, a time code that is to be added to the image signal.

10. The image pickup device according to claim 8, wherein the output selecting unit selects a minimum number of the at least one image output unit that enables the at least one image output unit to output the image signal in an available range of data transfer rate of the at least one image output unit.

11. The image pickup device according to claim 8, further comprising:

a table that defines a relationship between the image pickup mode and a parameter that is associated with the image pickup mode so as to identify the number of the at least one image output unit, wherein the output selecting unit refers to the table to select the at least one image output unit in accordance with the parameter.

12. An image pickup device comprising:

an image pickup element that picks up an image of an object so as to generate an image signal based on the image of the object;

a plurality of image output units, each of the plurality of image output units being adapted to output the image signal;

an image pickup mode selecting unit that selects an image pickup mode based on at least one of an image size and a frame rate; and an output selecting unit that selects at least one image output unit from the plurality of image output units in accordance with the image pickup mode so as to enable the at least one image output unit to actually output the image signal;

a dividing unit that generates divided sets of sub-image signals that each represent divided sets of sub-images, the divided sets of sub-image signals constituting the image signal that represents the image of the object, wherein the output selecting unit selects the same number of image output units from the plurality of image output units as the divided sets of sub-image signals so that the selected image output units output the divided sets of sub-image signals, wherein if the image size is a 1920×1080 image size, the output selecting unit selects three image output units from the plurality of image output units so that the selected three image output units operate in turn to output the image signal one frame by one frame and interleaved so that successive frames slightly overlap to maintain an output rate acceptable to the selected three output units.

13. The image pickup device according to claim 12, further comprising a time code generating unit that generates, in accordance with the image pickup mode, a time code that is to be added to the image signal.

14. The image pickup device according to claim 12, wherein the output selecting unit selects a minimum number of the at least one image output unit that enables the at least one image output unit to output the image signal in an available range of data transfer rate of the at least one image output unit.

15. The image pickup device according to claim 12, further comprising:

a table that defines a relationship between the image pickup mode and a parameter that is associated with the image pickup mode so as to identify the number of the at least one image output unit, wherein the output selecting unit refers to the table to select the at least one image output unit in accordance with the parameter.

* * * * *